United States Patent
Soloff et al.

(10) Patent No.: US 12,464,319 B2
(45) Date of Patent: Nov. 4, 2025

(54) METHOD AND SYSTEM FOR MANAGING TRACKING DEVICES

(71) Applicant: Bloodhound Tracking Device, Inc., Webster, TX (US)

(72) Inventors: Jason Anthony Soloff, Houston, TX (US); Curtis Dale Spencer, Houston, TX (US); Mark Wesley Garrett, Houston, TX (US)

(73) Assignee: BLOODHOUND TRACKING DEVICE, INC., Webster, TX (US)

( * ) Notice: Subject to any disclaimer, the term of this patent is extended or adjusted under 35 U.S.C. 154(b) by 0 days.

(21) Appl. No.: 19/066,972

(22) Filed: Feb. 28, 2025

(65) Prior Publication Data

US 2025/0280265 A1   Sep. 4, 2025

Related U.S. Application Data

(60) Provisional application No. 63/560,546, filed on Mar. 1, 2024.

(51) Int. Cl.
*H04W 4/029* (2018.01)
*G06Q 10/0832* (2023.01)
(Continued)

(52) U.S. Cl.
CPC ........ *H04W 4/029* (2018.02); *G06Q 10/0832* (2013.01); *G06Q 10/0833* (2013.01); *H04W 4/35* (2018.02); *H04W 4/38* (2018.02)

(58) Field of Classification Search
CPC .... H04W 4/029; H04W 4/38; G06Q 10/0832; G06Q 10/0833
(Continued)

(56) References Cited

U.S. PATENT DOCUMENTS

| | | |
|---|---|---|
| 11,770,677 B1 * | 9/2023 | Lesesky ........... H04W 4/42 455/456.1 |
| 2008/0004904 A1 | 1/2008 | Tran |

(Continued)

FOREIGN PATENT DOCUMENTS

EP   4475055 A1 * 12/2024   ........ H04W 52/0235

OTHER PUBLICATIONS

International Search Report and Written Opinion mailed Jan. 4, 2024 for corresponding PCT Application No. PCTUS2023033545 filed Sep. 22, 2023 (12 pages).

(Continued)

*Primary Examiner* — William Nealon
(74) *Attorney, Agent, or Firm* — Chamberlain, Hrdlicka, White, Williams & Aughtry; Aly Z. Dossa

(57) ABSTRACT

A method for managing data includes: initiating, by a communications unit (CU) processor of a CU, a communication module (CM); establishing, by the CM, a communication link (CL) to a management infrastructure (MI) over a network; notifying, by the CM, the CU processor about the CL; after the notifying: framing, by the processor, data that is received from a proximity wireless communication module (PWCM) based on a protocol of the CL to generate framed data, in which the PWCM has received the data from a second PWCM; transmitting, by the processor, the framed data to the MI over the CL; making, by the processor, a determination that the CL needs to be terminated; directing, by the processor, a communications manager of the CU to terminate the CL and to manage power consumption in the CU.

20 Claims, 10 Drawing Sheets

(51) Int. Cl.
    *G06Q 10/0833*    (2023.01)
    *H04W 4/35*      (2018.01)
    *H04W 4/38*      (2018.01)

(58) Field of Classification Search
    USPC ........................................................ 455/456.1
    See application file for complete search history.

(56) References Cited

U.S. PATENT DOCUMENTS

| | | | |
|---|---|---|---|
| 2009/0124304 A1* | 5/2009 | Twitchell, Jr. | H04W 84/18 |
| | | | 455/574 |
| 2011/0141853 A1 | 6/2011 | Megdal et al. | |
| 2011/0258930 A1 | 10/2011 | Francis et al. | |
| 2020/0355536 A1 | 11/2020 | Welle et al. | |
| 2020/0406860 A1 | 12/2020 | Mai et al. | |
| 2024/0002127 A1 | 1/2024 | Nauta et al. | |
| 2024/0414653 A1* | 12/2024 | Jantzi | G01S 19/34 |

OTHER PUBLICATIONS

Partial European Search Report, Application No. EP 25 161 036.6, Jul. 10, 2025 (11 pages).

* cited by examiner

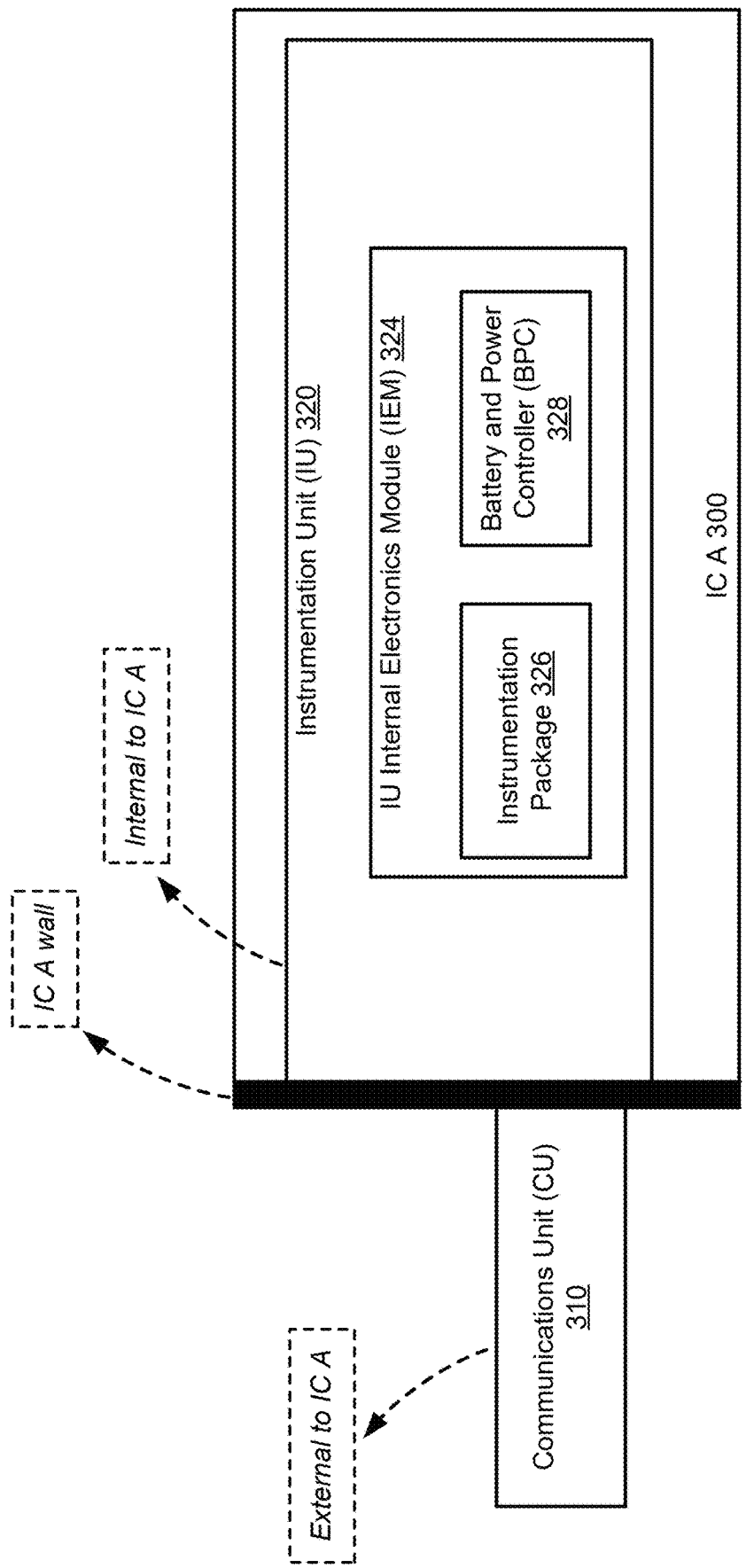
FIG. 3.1

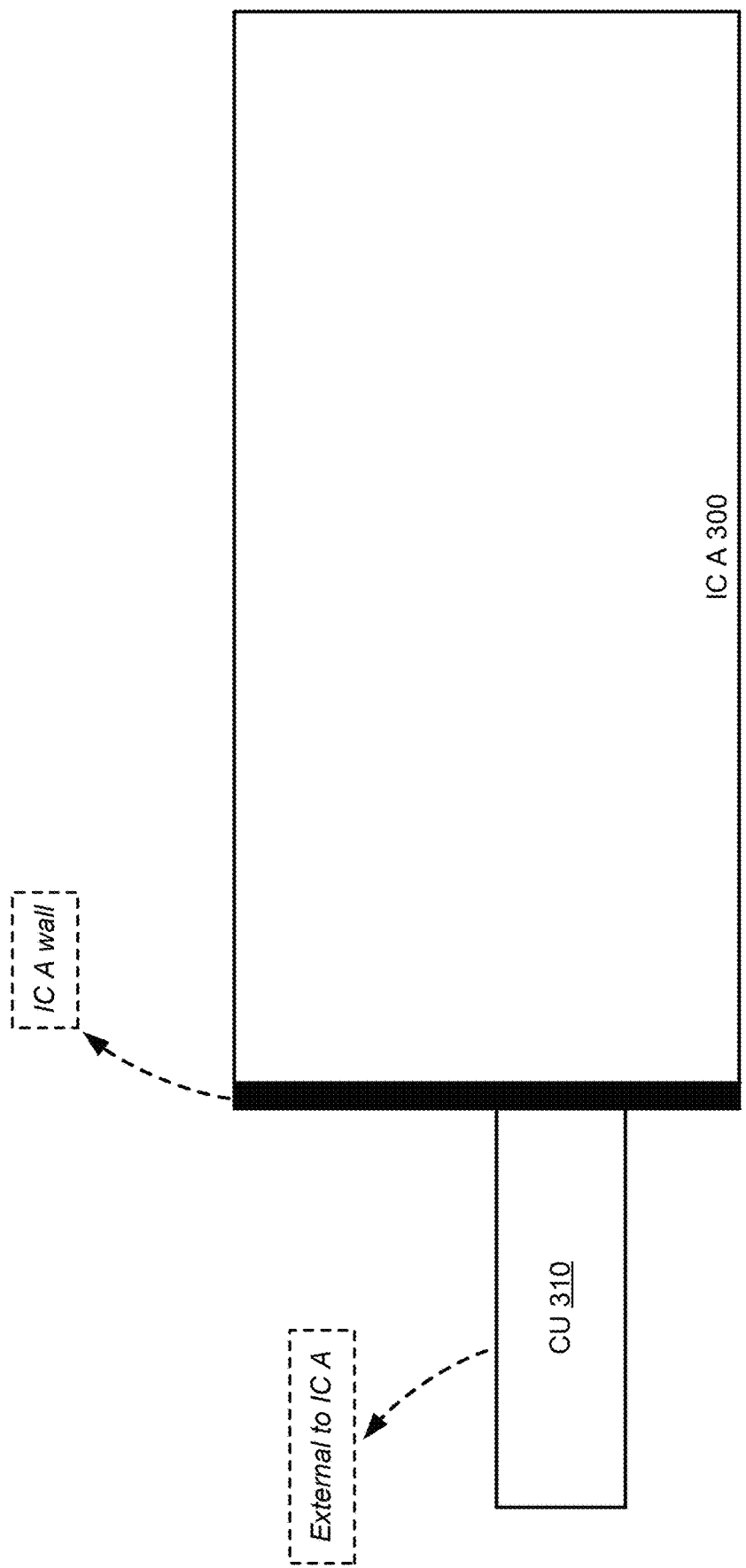

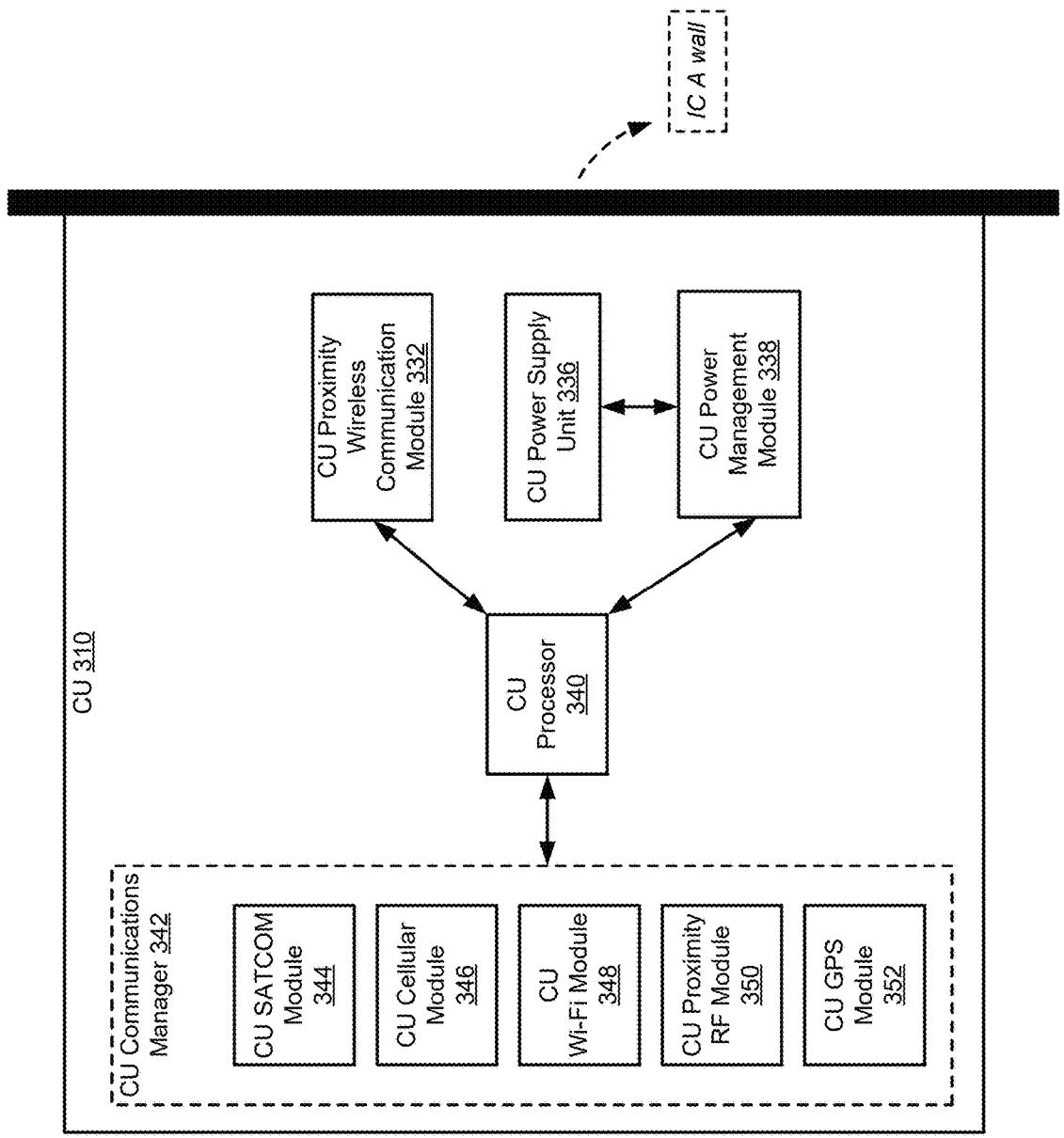
FIG. 3.3

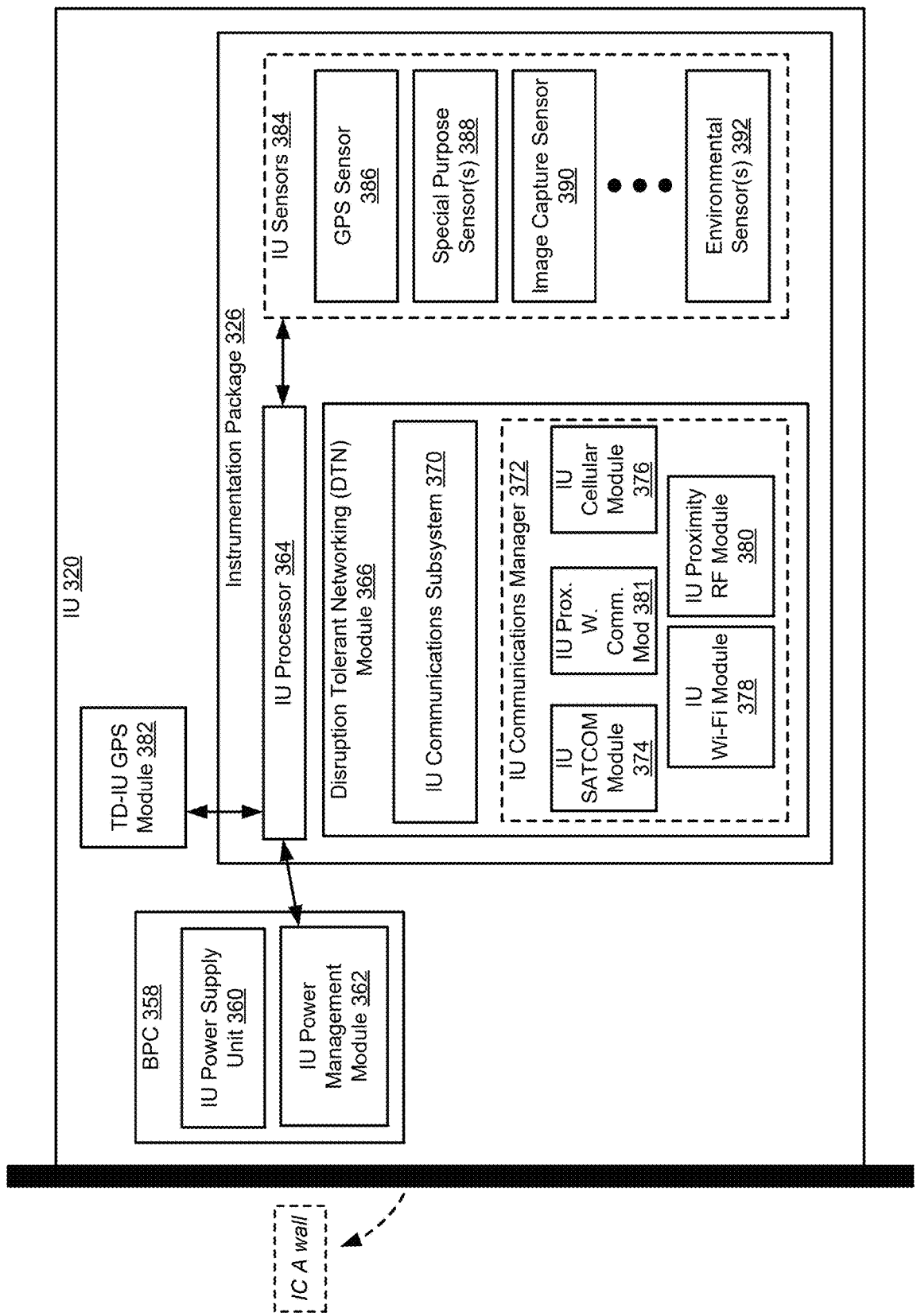
FIG. 3.4

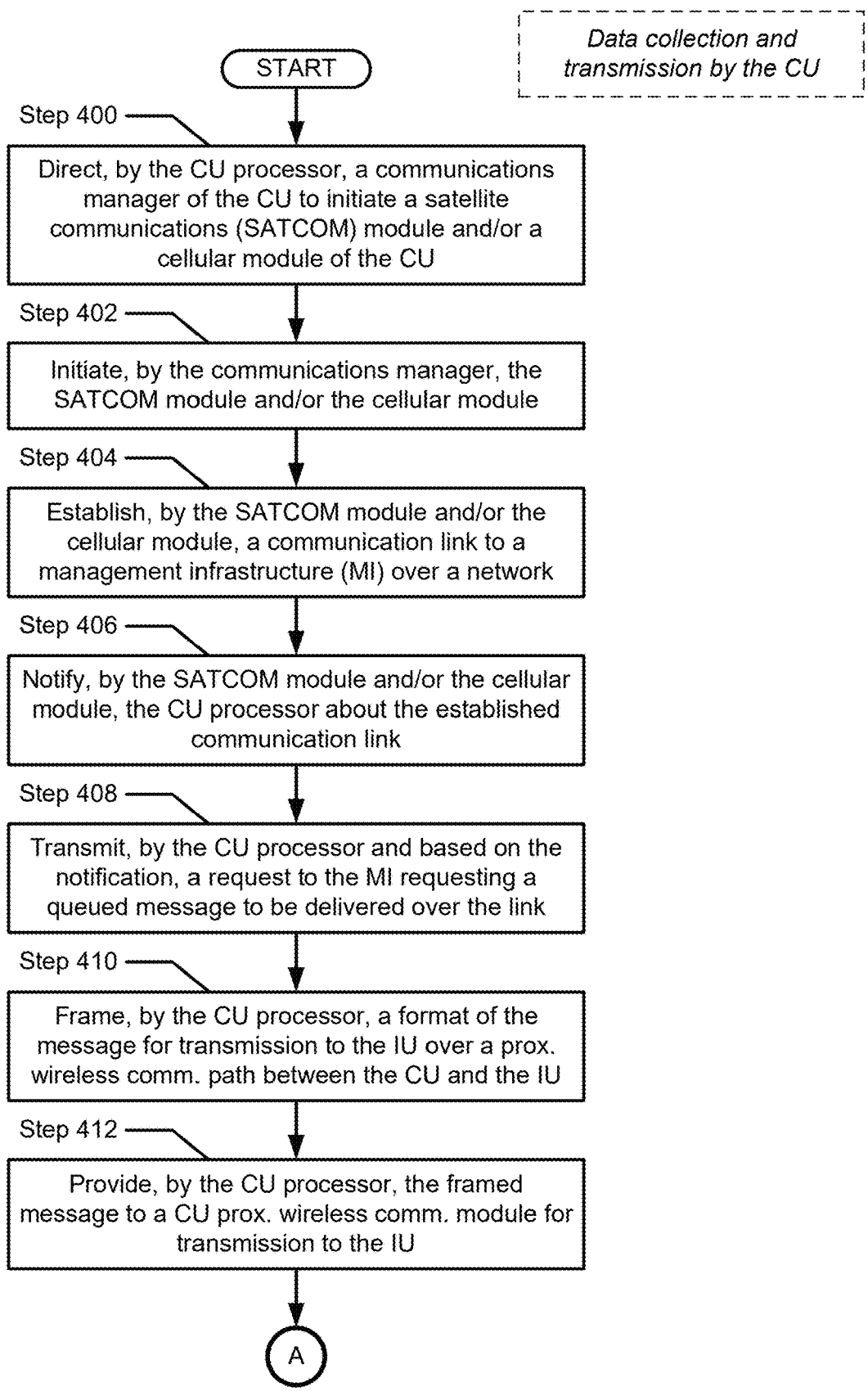
FIG. 4.1

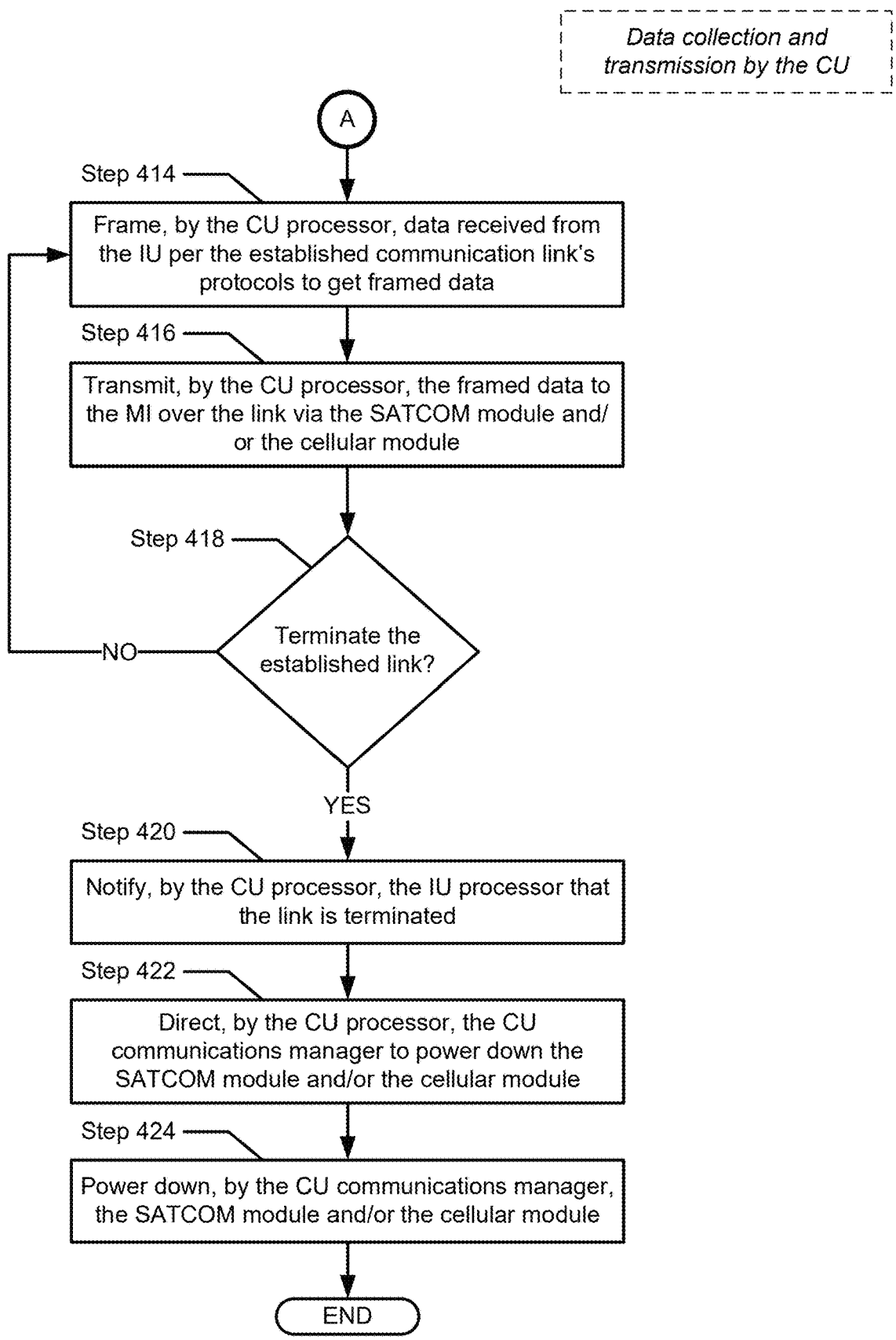
FIG. 4.2

METHOD AND SYSTEM FOR MANAGING TRACKING DEVICES

CROSS-REFERENCE TO RELATED APPLICATIONS

This application claims the benefit of U.S. Provisional Application No. 63/560,546, filed on Mar. 1, 2024, and titled "METHOD AND SYSTEM FOR MANAGING TRACKING DEVICES." U.S. Provisional Application No. 63/560,546 is hereby incorporated herein by reference.

BACKGROUND

Containers (e.g., intermodal shipping containers) are used to transport goods worldwide via ships, trains, and trucks. Given the wide range of environments to which these containers are exposed, and the way the containers are transported, makes it difficult to effectively track the containers as they travel from their point of origin to their ultimate destination.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIG. 3.1 shows a diagram of an intermodal container (IC) in accordance with one or more embodiments disclosed herein.

FIG. 3.2 shows a diagram of an IC in accordance with one or more embodiments disclosed herein.

FIG. 3.3 shows a detailed view of a communications unit (CU) in accordance with one or more embodiments disclosed herein.

FIG. 3.4 shows a detailed view of an instrumentation unit (IU) in accordance with one or more embodiments disclosed herein.

FIGS. 4.1 and 4.2 show data collection and transmission by the CU in accordance with one or more embodiments disclosed herein.

DETAILED DESCRIPTION

Figure 1:
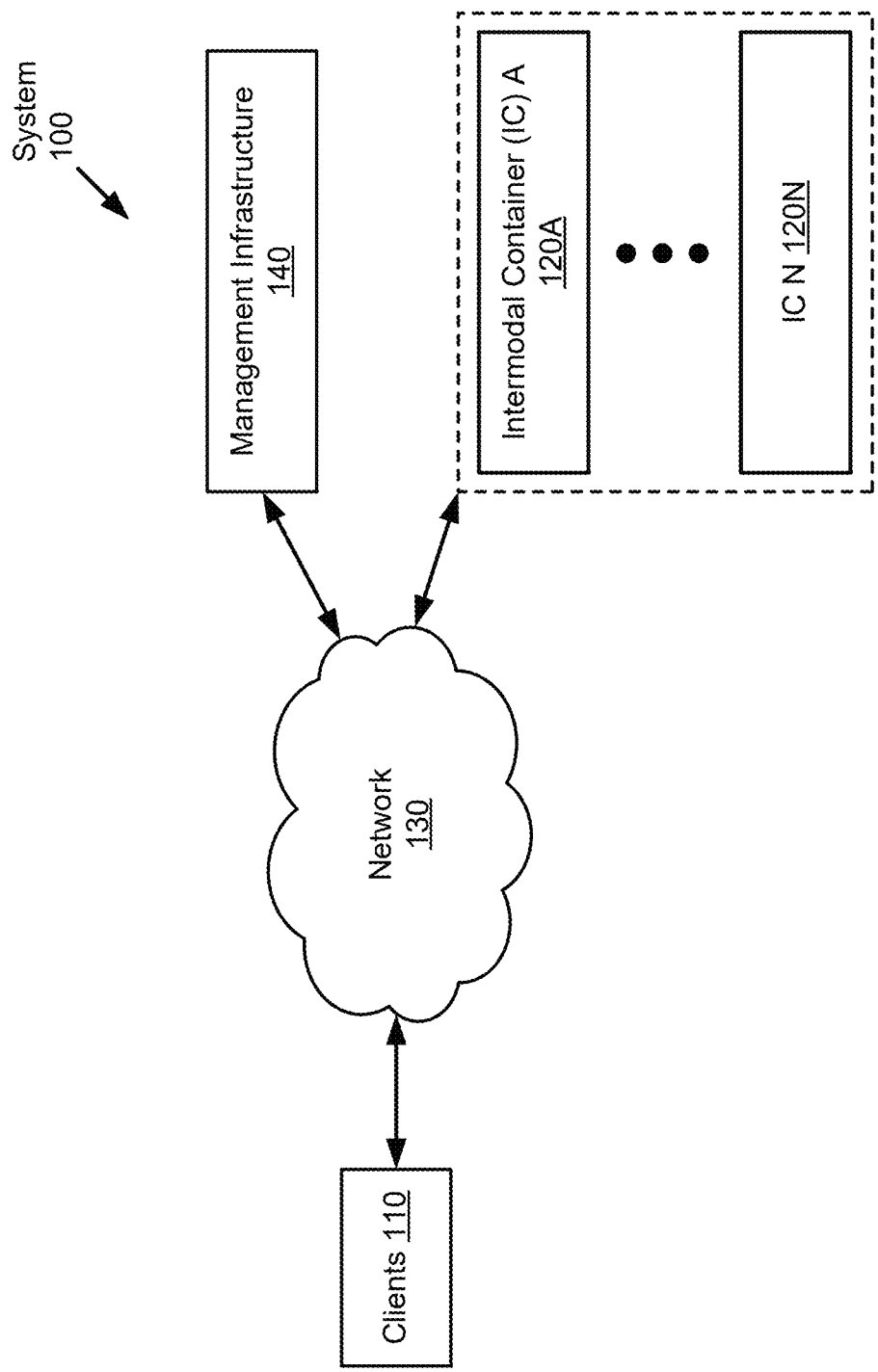
FIG. 1 shows a diagram of a system in accordance with one or more embodiments disclosed herein.

Containers are used to transport goods worldwide and often are made to a standardized specification. When in transit, particularly when in conjunction with overseas shipping, the containers will spend a large amount of time stacked together. This stacking of the containers, which are made of metal, create a Faraday cage effect whereby electromagnetic signals are difficult or impossible to transmit. As such, any system which may gather some data about a container is blocked from transmitting information when the container is in a stack of containers. Because the containers spend a large amount of time in this state, a lot of changes in the data about the container may occur. Someone who may wish to tamper with a container may have knowledge that no data is being transmitted while the container is in a stack and be able to tamper with the container without fear of the tampering being found until some much later time, if ever.

Further, conventional methods/approaches for communicating and/or passing information from the inside of a container to the outside of the container involve drilling holes in the structure of the container through which physical cabling is passed. Alternatively, some approaches have cut sections out of a wall of a container and used this gap to install, for example, sensing equipment so that the sensing equipment resides simultaneously inside and outside of the container. These approaches, at least, (i) resource-intensive, (ii) permanently alter the structure of a container, and (iii) compromise the environmental and weather resistance of the container.

For at least the reasons discussed above and without requiring resource (e.g., time, engineering, labor, etc.) intensive efforts, a fundamentally different approach is needed. To this end, embodiments disclosed herein provide a way by which information/data can be communicated from various sensors and instrumentation (e.g., computing devices) on the inside of a container to an "external" communications unit (CU) mounted on the outside of the container. Embodiments disclosed herein also make sure that information can be communicated from the CU to an "internal" instrumentation unit (IU), in which embodiments disclosed herein accomplish this without requiring modification of the container (e.g., drilling holes, running physical cabling, other physical connection between the inside and outside of the container, etc.). Further, embodiments disclosed herein provides a system in which data about the container may become useful to sense and transmit, for example, changes in chemical components, radiation, signs indicative of life, etc. This data may be received and processed at a central location in which the data may then be shared with customers, law enforcement, regulating organizations, governments, etc.

In addition, embodiments disclosed herein provide a way by which an external CU can be used without a paired internal IU in a related container. In this manner, a user/customer may not need to have a full set of internal sensors (e.g., IU sensors, see FIG. 3.4) to track the container (e.g., to track a main frame of the container, to track a shipment route of the container, etc.).

The following describes various embodiments disclosed herein.

FIG. 1 shows a diagram of a system (100) in accordance with one or more embodiments disclosed herein. The system (100) includes any number of intermodal containers (ICs) (e.g., IC A (120A), IC N (120N), etc.), a management infrastructure (140) (e.g., an operations center, a cloud/core subsystem, a data center, etc.), any number of clients (e.g., 110), and a network (130). The system (100) may facilitate management of data (e.g., sensor data, location data, etc.) from any number of ICs (e.g., 120A, 120N, etc.). The system (100) may include additional, fewer, and/or different components without departing from the scope of the embodiments disclosed herein. Each component may be operably/operatively connected to any of the other components via any combination of wired and/or wireless connections. Each component illustrated in FIG. 1.1 is discussed below.

Those skilled in the art will appreciate that while ICs are considered in the present disclosure, any type of container (that includes a wall where a CU and/or an IU can be affixed)

may be considered without departing from the scope of the embodiments disclosed herein.

In one or more embodiments, one or more internal and/or external components of the ICs (e.g., 120A, 120N, etc.), the management infrastructure (140), the clients (110), and the network (130) may be (or may include) physical or logical devices, as discussed below. While FIG. 1 shows a specific configuration of the system (100), other configurations may be used without departing from the scope of the embodiments disclosed herein. For example, although the clients (110) and the management infrastructure (140) are shown to be operatively connected through a communication network (e.g., 130), the clients (110) and the management infrastructure (140) may be directly connected (e.g., without an intervening communication network).

Further, functioning of the clients (110) and the management infrastructure (140) is not dependent upon the functioning and/or existence of the other components (e.g., devices) in the system (100). Rather, the clients (110) and the management infrastructure (140) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment, a cloud computing infrastructure, etc.) and may deliver at least computing power (e.g., real-time (on the order of milliseconds (ms) or less) network monitoring, server virtualization, data deduplication, etc.), storage capacity (e.g., data backup), and data protection (e.g., software-defined data protection, disaster recovery, etc.) as a service to users (e.g., people, end-users, etc.) of the clients (110). For example, the system may be configured to organize unbounded, continuously generated data into a data stream. The system (100) may also represent a comprehensive middleware layer executing on computing devices (e.g., 600, FIG. 6) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (110)) and other computations remotely (e.g., away from the users' site using other environments (e.g., 140)) from the users. By doing so, the users may utilize different computing devices (e.g., 600, FIG. 6) that have different quantities of computing resources (e.g., processing cycles, memory, storage, etc.) while still being afforded consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as a universal serial bus (USB) device), etc.

In one or more embodiments, the management infrastructure (140) may include one or more information handling systems (IHSs), in which an IHS (not shown) may include (i) a chassis configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, as being a physical computing device or a logical computing device, an IHS may be configured for, e.g.,: (i) hosting and maintaining various workloads, (ii) providing a computing environment whereon workloads may be implemented (e.g., employing a linear, non-linear, and/or machine learning (ML) model to perform cloud-based data processing), (iii) providing computer-implemented services to one or more entities, (iv) exchanging data with other components registered in/to the network (130) in order to, for example, participate in a collaborative workload placement (e.g., the IHS may split up a request (e.g., an operation, a task, an activity, etc.) with another IHS in the system (100), coordinating its efforts to complete the request more efficiently than if the IHS had been responsible for completing the request), (v) operating as a standalone device, (vi) providing software-defined data protection for the clients (110), (vii) providing automated data discovery, protection, management, and recovery operations for the clients (110), (viii) providing data deduplication for the clients (110), (ix) orchestrating data protection through one or more graphical user interfaces (GUIs), (x) empowering data owners (e.g., users of the clients) to perform self-service data backup and restore operations from their native applications, (xi) ensuring compliance and satisfy different types of service level objectives (SLOs) set by an administrator, (xii) simplifying VM image backups of a VM with near-zero impact on the VM, (xiii) increasing resiliency of an organization by enabling rapid recovery or cloud disaster recovery from cyber incidents, (xiv) providing long-term data retention (in conjunction with one or more databases (not shown)), (xv) providing operational simplicity, agility, and flexibility for physical, virtual, and cloud-native environments, (xvi) consolidating multiple data process or protection requests (received from, for example, the clients (110)) so that duplicative operations (which may not be useful for restoration purposes) are not generated, and/or (xvii) initiating multiple data process or protection operations in parallel (e.g., the IHS may host multiple operations, in which each of the multiple operations may (a) manage the initiation of a respective operation and (b) operate concurrently to initiate multiple operations). In one or more embodiments, in order to read, write, or store data, the IHS may communicate with, for example, storage systems (not shown) in the system.

As described above, the management infrastructure (140) may be capable of providing (via, for example, hosted IHSs) a range of functionalities/services to the users of the clients (110). However, not all of the users may be allowed to receive all of the services. To manage the services provided to the users of the clients (110), a system (e.g., a service manager) in accordance with embodiments disclosed herein may manage the operation of a network (e.g., 130), in which the clients (110) are operably connected to the management infrastructure (140). Specifically, the service manager (i) may identify services to be provided by the management infrastructure (140) (for example, based on the number of users using the clients (110)) and (ii) may limit communications of the clients (110) to receive management infrastructure provided services.

For example, the priority (e.g., the user access level) of a user may be used to determine how to manage computing resources of the management infrastructure (140) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the transmission control protocol (TCP), the user datagram protocol (UDP), delay/disruption tolerant networking (DTN) protocols, etc.) are to be opened, other ports are to be blocked/disabled so that (i) certain services are to be provided to the user by the management infrastructure (140) (e.g., while the computing resources of the management infrastructure may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (110) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the management infrastructure (140) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

Further, while a single IHS is considered above, the term "system" includes any collection of systems or sub-systems that individually or jointly execute a set, or multiple sets, of instructions to provide one or more computer-implemented services. For example, a single IHS may provide a computer-implemented service on its own (i.e., independently) while multiple other IHSs may provide a second computer-implemented service cooperatively (e.g., each of the multiple other information handling systems may provide similar and or different services that form the cooperatively provided service).

In one or more embodiments, an IHS (of the management infrastructure (140)) may provide any quantity and any type of computer-implemented services to users (and/or other computing devices such as, for example, other clients or other types of components). To provide computer-implemented services, the IHS may be a heterogeneous set, including a collection of physical components/resources (e.g., processing resources, storage/memory resources, networking resources, etc.) configured to perform operations of the IHS and/or otherwise execute a collection of logical components/resources (e.g., virtualization resources) of the IHS.

In one or more embodiments, a processing resource (not shown) may refer to a measurable quantity of a processing-relevant resource type, which may be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a virtual CPU (vCPU), a virtual GPU (vGPU), a virtual DPU (vDPU), a computation acceleration resource, an application-specific integrated circuit (ASIC), a digital signal processor for facilitating high speed communication, etc.

In one or more embodiments, a storage and/or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, dynamic RAM (DRAM), etc.

In one or more embodiments, the IHS may include a memory management unit (MMU) (not shown), in which the MMU is configured to translate virtual addresses (e.g., those of a virtual address space) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the IHS provide computer-implemented services to users, the IHS may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (110) may enter into agreements (e.g., SLAs) with providers of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface the IHS with external entities (e.g., computing devices of IC A (120A), the clients (110), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., TCP, UDP, DTN, Remote Direct Memory Access (RDMA), IEEE 801.11, etc.) for the transmission and/or receipt of data.

In one or more embodiments, a networking resource may implement and/or support the above-mentioned protocols to enable the communication between the HIS and the external entities. For example, a networking resource may enable the IHS to be operatively connected, via Ethernet, using a TCP protocol to form a "network fabric", and may enable the communication of data between the IHS and the external entities. In one or more embodiments, the IHS may be given a unique identifier (e.g., an Internet Protocol (IP) address) to be used when utilizing the above-mentioned protocols.

Further, a networking resource, when using a certain protocol or a variant thereof, may support streamlined access to storage/memory media of other entities in the system (100). For example, when utilizing RDMA technology to access data on a client of the clients (110), it may not be necessary to interact with the logical components of that client. Rather, when using RDMA technology, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual storage pool, etc. In one or more embodiments, a virtualization resource may include a hypervisor, in which the hypervisor may be configured to orchestrate an operation of, for example, a VM by allocating computing resources of the IHS to the VM.

In one or more embodiments, the IHS may implement a management model to manage the aforementioned computing resources in a particular manner. The management model may give rise to additional functionalities for the computing resources. For example, the management model may be automatically storing multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and numbers of management models may be implemented to provide additional functionalities using the computing resources without departing from the scope of the embodiments disclosed herein.

In one or more embodiments, an IC (e.g., 120A, 120N, etc.) may refer to as a shipping container (which may be made of stainless steel, aluminum, or other materials according to customer requirements) that is a large, standardized transport vessel including space for shipping/handling/transporting separable cargo/load components. The IC may include a main frame (not shown) including rectangular dimensions, in which the main frame (i) may be structurally engineered to support the stacking of one container on top of another (see FIG. 2), supported at the four corners, and (ii) may include posts, chords, struts, and load transfer plates. In one or more embodiments, the posts, cords, and struts may form open truss frames which have no enclosed panels, and which span the top, bottom, sides, and ends of the main frame to form a lightweight and rigid structure suitable for supporting cargo (or cargo shipments) thereon in a stacked configuration. The IC may be suitable for stacking on trucks, railcars, container ships, and the like.

An IC (e.g., 120A, 120N, etc.) may include additional, fewer, and/or different components without departing from the scope of embodiments disclosed herein. Additional details of the IC are described below in reference to FIGS. 3.1-3.4.

In one or more embodiments, a client of the clients (110) may include functionality to, e.g.,: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the management infrastructure (140)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (110) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more SLAs configured by users of the clients). The clients (110) may correspond to computing devices that one or more users use to interact with one or more components of the system (100).

In one or more embodiments, a client of the clients (110) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client of the clients (110). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client of the clients (110) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (110) may utilize, rely on, or otherwise cooperate with the management infrastructure (140). For example, the clients may issue requests to the management infrastructure to receive responses and interact with various components of the management infrastructure. The clients may also request data from and/or send data to the management infrastructure (for example, the clients may transmit information to the management infrastructure that allows the management infrastructure to perform computations, the results of which are used by the clients to provide services to the users). As yet another example, the clients may utilize computer-implemented services provided by the management infrastructure. When the clients interact with the management infrastructure, data that is relevant to the clients may be stored (temporarily or permanently) in the management infrastructure.

In one or more embodiments, to provide a consistent user experience to a user, a client of the clients (110) may implement virtualized (or virtual) desktop infrastructure (VDI) environment or other types of computing environments that enable remote resources (e.g., of the management infrastructure (140)) to provide computer-implemented services that appear to the user to be provided by the client. Said another way, the management infrastructure may facilitate VDI functionalities of the client, in which the management infrastructure may perform computations on behalf of the VDI environment(s) implemented/used by the client and provide the results of the computations to the client. By doing so, the client may be able to provide functionalities that would otherwise be unavailable due to the lack of computing resources and/or software implemented functionalities of the client.

In one or more embodiments, a client of the clients (110) may be capable of, e.g.,: (i) collecting users' inputs, (ii) correlating collected users' inputs to the computer-implemented services to be provided to the users, (iii) communicating with the management infrastructure (140) that perform computations necessary to provide the computer-implemented services, (iv) using the computations performed by, for example, the management infrastructure (140) to provide the computer-implemented services in a manner that appears (to the users) to be performed locally to the users, and/or (v) communicating with any virtual desktop (VD) in a VDI environment (or a virtualized architecture) provided by the management infrastructure (using any known protocol in the art), for example, to exchange remote desktop traffic or any other regular protocol traffic (so that, once authenticated, users may remotely access independent VDs via the client).

As described above, the clients (110) may provide computer-implemented services to users (and/or other computing devices). The clients may provide any number and any type of computer-implemented services. To provide computer-implemented services, each client of the clients (110) may include a collection of physical components (discussed above) configured to perform operations of the client and/or otherwise execute a collection of logical components (discussed above) of the client.

In one or more embodiments, a client of the clients (110) may be, for example (but not limited to): a physical computing device (e.g., 600, FIG. 6), a smartphone, a tablet, a wearable, a gadget, a closed-circuit television (CCTV) camera, a music player, a game controller, etc. Different clients may have different computational capabilities. In one or more embodiments, a first client of the clients (110) may have 16 gigabytes (GB) of dynamic RAM (DRAM) and 1 CPU with 12 cores, whereas a second client of the clients (110) may have 8 GB of PMEM and 1 CPU with 16 cores. Other different computational capabilities of the clients not listed above may also be considered without departing from the scope of the embodiments disclosed herein.

In one or more embodiments, users (e.g., administrators, organization executives, etc.) may interact with (or operate) the clients (110) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing virtualization technology. In one or more embodiments, an administrator may be a user with permission (e.g., a user that has root-level access) to make changes to the clients that will affect other users of the clients.

In one or more embodiments, for example, a user may be automatically directed to a login screen of a client of the clients (110) when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 600, FIG. 6) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, a "remotely-accessible" GUI (enabled by a related client) may provide (to a user), e.g.,: (i) information with respect to one or more ICs (so that the user may track and trace information on any IC), (ii) access to local IC mesh network (see FIG. 2), (iii) real-time geolocation (with live map overlay), (iv) information with respect to sensor history and pattern from a captured event, and/or (v) real-time action alert notifications/information with respect to, for example, IC door open/close, geofence exceedance, IC location, radiation levels, etc.

In one or more embodiments, the network (130) (or the "network environment") may represent a (decentralized or distributed) computing network and/or fabric configured for computing resource and/or messages exchange among registered computing devices (e.g., the clients (110), the management infrastructure (140), etc.). As discussed above, components of the system (100) may operatively connect to one another through the network (e.g., a DTN, a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, DTN Bundle Protocol, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, DTN communications, etc.), (ii) being configured by one or more components in the network (130), and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

In one or more embodiments, the non-real-time network traffic may be low priority (e.g., non-urgent) network traffic. For this reason, data packets of the non-real-time network traffic may not need to be prioritized in the network (130). The non-real-time network traffic may include data packets related to, for example (but not limited to): File Transfer Protocol (FTP) for web publishing, email applications, Bundle Protocol, etc.

Figure 2:
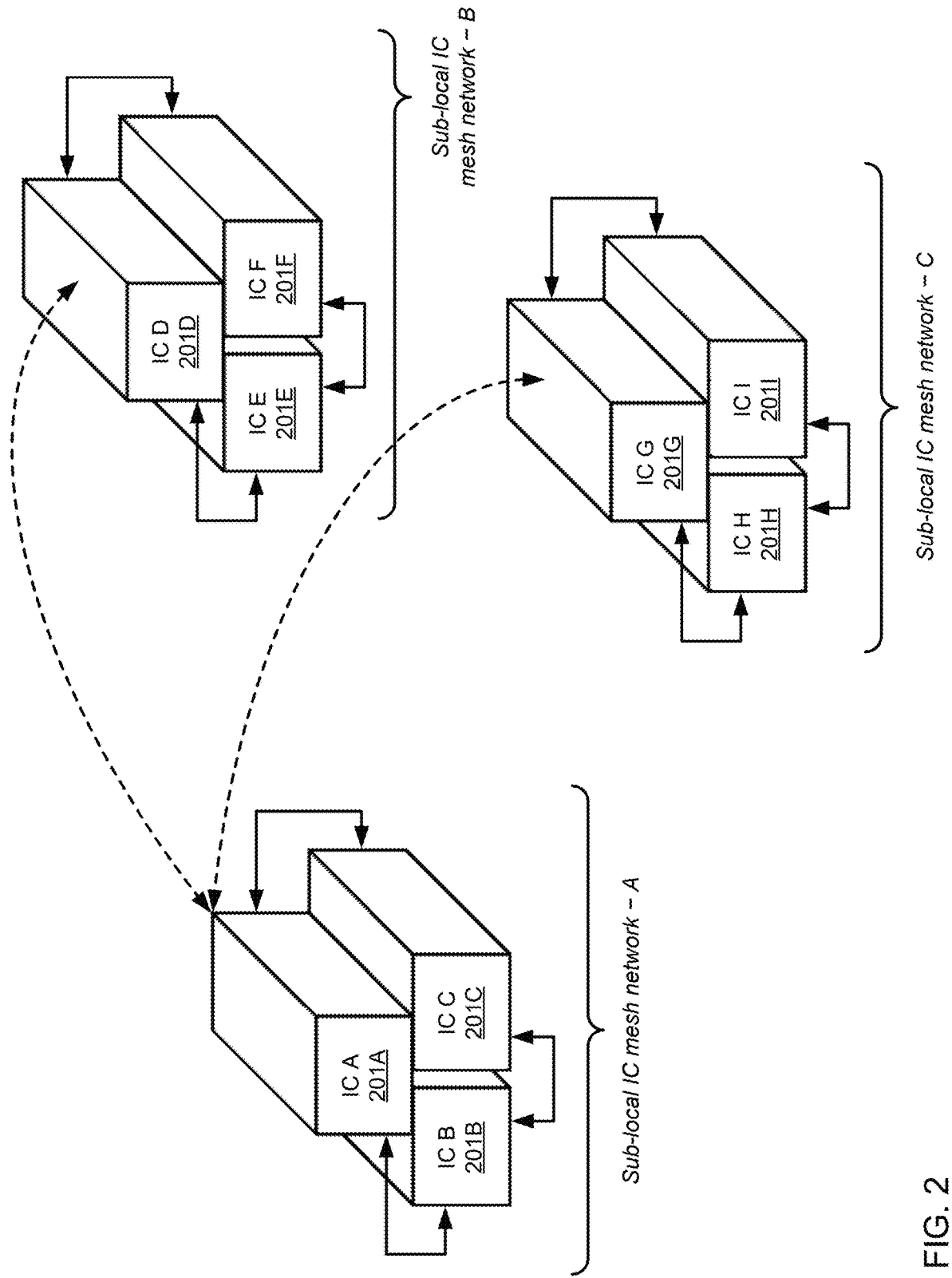
FIG. 2 shows a diagram of a local tracking device mesh network capability among multiple tracking devices in accordance with one or more embodiments disclosed herein.

Turning now to FIG. 2, FIG. 2 shows a diagram of a local mesh network capability among multiple tracking devices (where a tracking device may (i) include a CU and an IU (see FIG. 3.1) or (ii) include only a CU (see FIG. 3.2)) in accordance with one or more embodiments disclosed herein. In one or more embodiments, the local mesh network may include one or more "sub-local IC mesh networks", in which (i) sub-local IC mesh network—A may include IC A (201A)—IC C (201C) (e.g., in which IC A—IC C may be located at a north side of a shipyard), (ii) sub-local IC mesh network—B may include IC D (201D)—IC F (201F) (e.g., in which IC D—IC F may be located at a south side of the shipyard), and (iii) sub-local IC mesh network—C may include IC G (201G)—IC I (201I) (e.g., in which IC G—IC I may be located at a west side of the shipyard). IC A (201A) may be an example of an IC A discussed above in reference to FIG. 1.

In one or more embodiments, the solid arrows illustrate the sub-local IC mesh network among ICs in proximity. For example, the solid arrows in sub-local IC mesh network-A represent the connectivity/communication among IC A (201A)-IC C (201C) (via their CUs/IUs radio frequency (RF) communication capabilities). Further, the dashed line arrows illustrate a WAN (e.g., a unique, local IC mesh network including multiple tracking devices), in which the tracking devices in IC stacks may further communicate for various purposes. For example, because IC A (201A) and IC C (201C) are in close proximity, they may communicate over sub-local IC mesh network-A (e.g., via a low-frequency RF communication), whereas because IC A (201A) and IC D (201D) are not in close proximity, they may communicate over the WAN (IC D (201D) may then communicate with the management infrastructure (e.g., 140, FIG. 1) (via, for example, a cellular path, a Wi-Fi path, a GPS path, and/or a satellite communications (SATCOM) path) to transmit data received from IC A (201A) (where the management infrastructure may then (a) use that data, for example, to perform data analytics/processing, to training an ML model, etc., and/or (b) provide that data to a user of a client to aid in enforcing laws and regulations), where IC A may receive that data from IC B (201B) over a proximity wireless communication path (e.g., a low-frequency RF communication channel, which may implement long range signal modulation, link coding, and RF channelization protocols).

As yet another example (to indicate the advantage of DTN over TCP/IP or UDP/IP), consider a scenario where IC B (201B) (more specifically, Tracking Device B of IC B) needs to send sensor data to the management infrastructure (e.g., 140, FIG. 1) but could not establish a connection with the management infrastructure (e.g., the cloud). However, via its proximity, Tracking Device B may communicate with either Tracking Device A of IC A (201A) or of Tracking Device C of IC C (201C), and then, Tracking Device B provides the data to Tracking Device C (so that Tracking Device C may transmit the data to the cloud). In fact, Tracking Device C does not have the capability of transmitting the data to the cloud and, for this reason, Tracking Device C passes the data to Tracking Device A.

After receiving the data, Tracking Device A may communicate with Tracking Device D of IC D (201D) over the WAN (because (i) Tracking Device A knows that Tracking Device D is the next hop in the "DTN" direction/route to the cloud (as a result of contact graph route information exchange occurred before with Tracking Device D) and (ii) Tracking Device D has a connection to the cloud) and provide the data. Thereafter, using its SATCOM module, Tracking Device D may transmit the data to the cloud. As indicated, without knowing which Tracking Device has a connection to the cloud (or without knowing the end-to-end connection path towards the cloud), Tracking Device B first provided the sensor data to Tracking Device C, Tracking Device C then passed the data to Tracking Device A, Tracking Device A transmitted the data to Tracking Device D, and eventually, the data is transmitted to the cloud by Tracking Device D.

In one or more embodiments, a mesh (e.g., sub-local IC mesh network-A) may not be deterministic in connections among tracking devices, as new tracking devices may be added (or existing tracking devices may be removed) and routing paths may change as the geometry between ICs (or tracking devices) varies over time. A tracking device in a mesh topology (i) may need to be able to detect new/added tracking devices in close proximity, (ii) may establish links/communication paths with them, (iii) may establish itself as a node in a broader network (e.g., the WAN), and/or (iv) may offer its connection paths as routes to other tracking devices.

Referring back to the scenario discussed above, mesh networking techniques (while a popular catchphrase), are not enough by themselves. Most commercial mesh networks (including those targeted for IoT applications) fundamentally rely on a subset of the ubiquitous TCP/IP or UDP/IP networking stacks that operates based on the terrestrial IP. These protocols may provide various useful functionalities (e.g., being flexible as new applications for networking are envisioned), they may have several fundamental flaws for one or more embodiments.

In general, IP networks assume the operation environment is a richly connected environment. For example, IP-based networking protocols assume that connections between routers are many and persistent, and once a connection between two routers is established, the network may assume that the connection will remain for relatively long period of time. This assumption may result in the need in IP-based networks to have end-to-end connectivity across an entire network for data transmission. If a communication path (including various routing points/hops) does not exist (or was not maintained) between a sender and a recipient, the data may not flow (or may lost in transit if the path ceased to exist during the corresponding session).

Further, this assumption may be based on modern networking and its history of physical connections by physical wires, fiber optics, and other direct paths. RF-based networking (e.g., Wi-Fi/802.11) and mobility introduced by cellular networks has forced TCP/IP and UDP/IP based networks to improve in this area while (i) many standards and/or protocols have been developed within the IEEE, IETF, and IRTF, and (ii) the overlaying applications and underlying link layer and network routing protocols (of Internet) assumed connectedness.

Even in highly mobile environments, actual routing points for reliable network traffic may be the cell phone network endpoints (e.g., cell towers) rather than cell phones themselves. Management of local links within a cell is performed at the tower level, which is why "handoffs" between cell towers may be challenging to implement real-time applications (e.g., streaming services), because an application may suddenly need to renegotiate for a new session along with a new route/path.

On the other hand, IP networks assume short delays in data communication. In general, IP-based applications operate via "session-based" protocols, indicating that there is a set of events that occur between two nodes to complete a process of communication. Long or unexpected delays may cause a session to "time out" based on the assumption that a failure has occurred, requiring a connection re-establishment and data retransmission. In reality, no failure may have happened—it's possible the data just hasn't gotten there yet. If a response (to a data transfer request) is not received in time by a low-level link protocol (e.g., TCP, UDP, etc.), the result may be a failure and depending on the protocol, (a) UDP may drop the data or attempt to reduce the data rate, and (b) TCP may request a repeat and try again, and may renegotiate the link data rate assuming that loss was due to congestion and in so doing "throttle" the link to the point where no communication may occur. In particular, repeated failures from a simple delay may cause TCP to operate at low data rates and to fill the corresponding BW with protocol layer messages requesting retries and trying to re-establish a connection.

Continuing with the above discussion, IP networks assume that communication links are symmetric and bidirectional. Also related to the history of networking, when a connection is established in one direction, the connection is usually available in the other direction and at similar speeds (especially the connection is established via cables). In challenged or constrained networks (e.g., mesh networking in sparse environments, as considered in the present disclosure); however, this assumption does not hold.

Further, conventional networking (and therefore most mesh approaches) assumes similar data rates in both directions of a bidirectional link. This allows for large amount of network traffic to be consumed by "chatty" protocols (e.g., TCP, HTTPS, etc.) without even transmitting the actual data. If the link supports a high-rate in both directions, as is the case for the Internet, this may not be an issue. However, in resource constrained environments and for low-rate supported links, this may become a major issue (e.g., if most of the traffic is just for protocol overhead, not for user data transmission).

Additionally, IP networks assume that links include low-error rates. Said another way, conventional networking assumes that if a link is present, data will make it across to its destination (which is a possible result of wired connections). Most of current mobile networks attempt to mitigate this issue by implementing advanced error correcting methods (e.g., a forward error correction (FEC) method), but these methods may not protect against all errors. For example, as signal quality degrades to a low signal-to-noise ratio (SNR), the error floor increases, and eventually the "bit error rate" hits a point where the FEC method cannot correct enough errors. At that point, the FEC method may behave as an "all or none" filter and the corresponding link may fail from the perspective of the conventional IP networking protocol.

As discussed above, to overcome the aforementioned issues of the conventional IP-based networking, the present disclosure implements a DTN. As an alternative approach for architecting, implementing, and operating a network, a DTN may, e.g.,: (i) use a network stack that is based on the Bundle Protocol and the Licklider transmission protocol (LTP), in which the Bundle Protocol serves a similar role to the IP (e.g., encapsulating messages in "bundles", providing delivery information, supporting routing and accountability along a link, etc.) and the LTP serves a function at the link layer as that of TCP (however where the IP requires these functions to be provided or augmented at the application or link/transport layers, the Bundle Protocol includes these functions natively); (ii) include one or more bundle agents and/or bundle routers (see FIG. 3.4), where a bundle router may be both endpoint source and destination while serving as the intermediary path router function; (iii) be protocol and link agnostic below the bundle protocol layer (indicating that TCP, UDP, or other protocols may be used where appropriate to carry bundle protocol traffic); (iv) assume that the related network is sparsely connected (e.g., the network may include very few nodes and those nodes may not always connected); (v) assume that there will be delays (during communication) and those delays may be infinite; (vi) assume that all the links are one way; (vii) assume that all the links will operate in the presence of noise; (viii) assume a trustless state; (ix) not care if an end-to-end link is present (or if it ever will be); (x) not care if it takes a long time for a message/data to get across or for a response to come back; and/or (xi) not care if the return path is the same as the forward path.

In one or more embodiments, DTN may provide the aforementioned functionalities based on being a "session less" networking platform (because the Bundle Protocol requires that the communication be atomic), in which IP traffic (and its supporting network and link layer) assume a bidirectional "session" to be involved in every data transfer. To this end, all the information necessary to successfully exchange data may be included in a single bundle.

In one or more embodiments, bundle exchanges may be one-way events, which means (i) there is no need for a recipient to directly and immediately acknowledge that it has received a bundle for the transfer to be successful and (ii) IP's need for bidirectional links is not a requirement for the Bundle Protocol. Further, DTN is built based on "hop-by-hop" principles rather than "end-to-end" principles, in which (a) IP-based networking assumes that a path exists (and will continue to exist) all the way across a network (e.g., an IP-based network must be consistent and consistency connected) and (b) it may be sufficient for a DTN to communicate only to the next node along the path/route in the direction of the destination (e.g., a DTN only requires a single hop, indicating that data may flow across the network even if an end-to-end path does not currently exist). Additionally, in an IP-based networking, the custody of a message may need to be maintained by the same carrier all the way between a source and a destination, whereas in a DTN, the custody of a message may be maintained by different carriers along the direction of the destination.

In one or more embodiments, a DTN may assume that the corresponding links will be lossy and noisy, which may be a direct result of having to operate in extremely low SNR environments. The result of low-SNR may increase noise floors and therefore more errors may occur in the related channel. To overcome this issue, the DTN may assume that there will be errors in the channel, indicating that retransmission and requests for retransmission between two bundle agents across a node-to-node single-hop link must be assumed to be frequent and, therefore, must be low overhead (which may be particularly important for very low-rate links experiencing long delays).

Further, where (i) the TCP fails in lossy, disconnected, and high-latency environments, and (b) the UDP does not provide any form of reliable delivery service (by design), the LTP provides optimized functionalities for lossy channels experiencing long delays—but only between two nearest nodes and only for a single hop. As indicated, the LTP is not intended as an end-to-end protocol, and it provides a bandwidth (BW) efficient, highly reliable, and node-to-node data transfer.

In one or more embodiments, a DTN may be an overlay network, in which communications may be performed across different RF bands and any terrestrial network types (e.g., direct serial over dedicated cables, the Internet, etc.). Said another way, a DTN may be able to communicate over whatever links or networks are available. In particular, a DTN may overlay other networks, viewing whatever connectivity path is available as a link between DTN nodes. When the corresponding DTN node is able to establish a communication link/path through a network (indicating that the DTN node has the physical ability and low-level protocol ability to do so), bundles may flow over that path.

In one or more embodiments, a DTN node may be designed to communicate over physical connections, RF links/paths, optical links, and/or other means. The Bundle Protocol may not care what media it is traveling over and a DTN may not care what the underlying network physical, link, or topology is. This may occur on a "link-by-link" basis, where a region of a DTN may employ SATCOM (for communication), while a second region of the DTN may employ Wi-Fi, and a third region of the DTN may employ a terrestrial Internet connection.

In one or more embodiments, the network (e.g., 130, FIG. 1) may be a DTN, in which, for example, the management infrastructure (e.g., 140, FIG. 1) may perform management of ICs, health and status monitoring of ICs, and/or alert/event processing remotely via the DTN. The use of the Bundle Protocol (and the LTP) as an overlay to other protocols (such as long range (LoRa) and TCP/IP) (i) allows data on the DTN to traverse across highly challenged mesh networks and/or highly contested and low-SNR environments, and (ii) allows data (e.g., sensor data, status data, etc.) to simultaneously traverse across standard, IP-based networks as an overlay. Each IU or CU of the corresponding IC may serve as a DTN node and the corresponding hardware/software component(s) in the management infrastructure (e.g., 140, FIG. 1) may serve as a DTN endpoint for the DTN. In this way, the present disclosure have architected an independent overlay network that may traverse and co-exist with the terrestrial Internet connection and "ride" commercial telecom services that were not designed as DTNs.

Further, each IU may execute a bundle agent (see FIG. 3.4), indicating that the functions of end-to-end communication, node-to-node communication, accountability, and/or routing (including route updating/path management) are all included in a component executing on each IU. The implementation on an IU may be aware of each communication channel available to it (via its communications manager (see FIG. 3.4)), including the commercial telecom channels (e.g., cellular channels, SATCOM channels, etc.), provider services (e.g., facility Wi-Fi services), and unique TD capabilities (e.g., a low-frequency RF communication path/channel).

In one or more embodiments, an IU (e.g., 320, FIG. 3.4) may support one or more paths that may be used for routing messages/data in the form of bundles. The IU may establish connections via various cellular, SATCOM, and/or Wi-Fi networks, as well as other unique techniques (e.g., a proximity wireless communication channel). These connections may be established using link detection and link establishment protocols based on several proven mobile ad-hoc networking (MANET) approaches. Once established, the "next door neighbor" (e.g., other IU's bundle agent) may be identified in a routing database of the IU's bundle agent. Then, the two bundle agents may exchange information with each other and with other bundle agents in the DTN of which they are aware and the likelihood of being able to get a message (eventually) through to them. A probabilistic link path model may be employed (by the corresponding bundle agent) to identify the most promising path to transmit data (e.g., among the IUs that are connected to the main IU). In one or more embodiments, each bundle agent may establish a local map of DTN connectedness and route directionality from its perspective, in which this map is unique to each IU and may change with varying connections over time.

In one or more embodiments, highly disconnected nature of a DTN may not affect the operation of a tracking device deployed to an IC. In most cases, an IU (e.g., 320, FIG. 3.4) may only need to move a small amount of information (e.g., status data (a couple of kilobytes per-hour), video data (a couple of megabytes per-hour), etc.) and may perform so sporadically. In some other embodiments, the IU may need to be able to asynchronously receive communications/messages from the management infrastructure (e.g., 140, FIG. 1), including command and control information as well as requests for health and status of the corresponding IC. Those messages may not need to travel along the same path (or occur at the same time) in the DTN, which indicates a topology that is asymmetric and experiences frequent disruptions.

Further, the assumption of lower BW and high error rates may not affect a tracking device's RF path communication capabilities. As discussed above, the tracking device may need to operate in a harsh environment that includes one or more interferences (e.g., weak links, high multipath interferences, etc.) and/or frequent interruptions (e.g., due to highly disconnected, low-SNR, contested and congested link conditions). The fundamental design of the tracking device and underlying protocols of the DTN are well suited to operate in this type of environment.

In one or more embodiments, a tracking device may never need a real-time bidirectional communication. While extreme delay is not acceptable, there is no real difference to the tracking device's operations if a message takes seconds or minutes to reach its destination (e.g., the next tracking device along the communication path, the management infrastructure (e.g., 140, FIG. 1)). At the end, the vital point is that, for example, whether or not the corresponding data is (eventually) delivered to the management infrastructure and/or the corresponding command is (eventually) delivered to the corresponding IC's tracking device. The path taken and/or the delay encountered along the path (within a reason) may not need to be considered.

As indicated above, by employing DTN techniques, the system (e.g., 100, FIG. 1) may overcome the majority of the environmental, spectrum, time, BW, and/or connectivity challenges encountered by today's IoT mesh network based systems, as well as those encountered by all the currently available service and product offerings.

In one or more embodiments, local connectedness of an IC may be enabled through low-frequency RF paths using simple, low-SNR modulations with advanced signal processing and FEC methods (for short proximity links), direct connection and "through the stack" RF communications, and/or through the DTN via "up and down" short hop communications over locally available Wi-Fi and cellular channels, and globally available SATCOM channels. MANET techniques may be used to (i) establish local mesh network enclaves among tracking devices in close proximity, (ii) route traffic to, from, and/or among the tracking devices that do not have a clear line of sight for commercial telecom (e.g., Wi-Fi and cellular channels), and/or (iii) manage mobility of each IC (because the ICs may be located in anywhere in the world, for example, to be loaded or to be shipped, and these events need to be monitored).

Further, a wide area connection to the management infrastructure may be provided by the DTN treating commercial telecom as an underlying link layer to its higher-level overlay. To this end, the corresponding network traffic may traverse the majority of commercial telecom services without interruption or requiring gateways to provide network translation. This provides global, highly available connectivity between deployed tracking devices and the DTN.

As used along the present disclosure, an IC (e.g., 120A, FIG. 1) may include any facility (e.g., a tracking device) or a portion of a facility in which computing operations are carried out. An IC may include IHS components (e.g., CU components, IU components, etc.) coupled together as functional IHS components, in which these components are dedicated to serve specific functions or to serve multiple functions. Examples of computing operations may include (but not limited to): information processing, communications, testing, simulations, power distribution and control, operational control, etc.

Turning now to FIG. 3.1, FIG. 3.1 shows a diagram of an IC (IC A (300)) in accordance with one or more embodiments disclosed herein. IC A (300) may be an example of an IC discussed above in reference to FIG. 1. IC A (300) includes a CU (310) and an IU (320) pair, in which the IU (320) includes, at least, an IU internal electronics module (324) including an instrumentation package (326) (as a "tracker" part of the IU) and a battery and power controller (328) (as a "battery pack" part of the IU). IC A (300) may include additional, fewer, and/or different components without departing from the scope of the embodiments disclosed herein. Each component may be operably connected to any of the other component via any combination of wired and/or wireless connections (where battery/power supply connections of the related components not shown for clarity). Each component illustrated in FIG. 3.1 is discussed below in reference to FIGS. 3.3 and 3.4.

In one or more embodiments, a tracking device of IC A (300) (which is formed by the CU (310) and the IU (320) pair) may provide globally available, highly reliable insights into the position and condition of IC A (300) and may enable positive accountability and chain of custody of cargo shipments carried by IC A (300) throughout the global supply chain. The tracking device may equally be capable of providing information on cargos (inside IC A (300)) travelling by ship, truck, rail, or at rest at a transfer point. The tracking device's architecture is also applicable for cargos traveling by air transportation.

As described above, the tracking device may be installed in pairs (e.g., the tracking device may be installed as a two-pack/unit device): (i) the IU (320) installed/mounted on the inside/interior of IC A (300) and (ii) the CU (310) (as a "communications" part of the tracking device) installed/mounted on the outside/exterior of IC A (300). The tracking device (and its components) may operate free of maintenance or end-user interaction (where the tracking device is internally powered and self-contained requiring minimal installation and/or configuration effort (e.g., battery is hot swappable when a customer wants to change it)), and all control, health and/or status monitoring, and alert/event processing may occur remotely via a network (e.g., 130, FIG. 1). The tracking device may be implemented as other types of structures adapted to physically, mechanically, electrically, and/or thermally manage IC A (300). In this manner, the tracking device may enable IC A (300) to be densely packed without negatively impacting the operation of the CU (310) and the IU (320).

As used herein, "mounting" a particular component on another component may refer to positioning the particular component to be in physical contact with the other component, such that the other component provides structural support, positioning, structural load transfer, stabilization, shock absorption, some combination thereof, or the like with regard to the particular component.

In one or more embodiments, the tracking device (and its components) may be installed/mounted on a physically protected area of IC A (300) (e.g., an RF transparent housing, where the housing may replicate a standard IC vent) while IC A is empty and with no physical modifications to IC A (e.g., no drilling, modification, etc., to IC A for easy installation and removal; the IU (320) is designed to fit the available volume of the steel structural ribs and protected geometry at the top/roof of IC A; etc.). The tracking device may be connected to IC A using a magnetic attachment and/or other non-magnetic mechanism that does not affect the structural aspects of IC A. Using a magnetic attachment and/or a non-mechanical mechanism (e.g., adhesive/glue fastening) may also enable the tracking device to be quickly installed without the use of any external tools (e.g., under 10 minutes). In addition, the power supplies (e.g., 336 (FIG. 3.3), 360 (FIG. 3.4), etc.) for the tracking device are removable, thereby enabling a short period of time and effort required to provide additional power to the tracking device (e.g., 5 minutes to change out a battery (approximately every two years due to battery's life)).

Other mechanical (e.g., locking wiring) or non-mechanical mechanisms for affixing the tracking device (and its components) to IC A (300) may be used without departing from the scope of the embodiments disclosed herein.

In one or more embodiments, as being a global, non-parasitic, non-interfering, multi-functional, low-cost, long lasting, and low-touch computing device, the tracking device may include functionality to, e.g.,: (i) provide precise, worldwide, on-demand, and/or periodic location and status of individual containers (e.g., for commercial equipment track and trace, for commercial fleet security and awareness, for industrial/construction equipment theft detection and/or recovery, etc.); (ii) detect and report changes in environmental conditions/levels; (iii) detect and identify hazardous chemicals and/or radiation within a container by using one or more sensors; (iv) be adapted to provide a small, high-availability DTN/MANET node capability for field deployed components; (v) with the help of the CU (310), be useful for, for example, harsh sub-sea resource explorations, remotely operating vehicle operations, communications, and/or underwater drilling environments; (vi) with the help of its small, DTN-based networked communications terminals, be useful in constraint environments (e.g., space systems, space applications, etc.); (vii) with the help of Bundle Protocol based DTN, be inherently protected against most cyber threats (e.g., a DOS attack, a man in the middle attack, etc.) because (a) the tracking device's communication approach does not use an IP, (b) the majority of cyber threats require the presence of an IP-based network, and (c) there is no attack surface; (viii) be useful for scientific applications (e.g., geology, environmental monitoring, habitat/wildlife monitoring, oceanography, space science and lunar, planetary exploration, etc.), local/municipal applications (e.g., weather monitoring, air quality monitoring, public safety monitoring, etc.), and/or defense/intelligence applications (e.g., next-generation battlespace communications, high-assurance communications in constrained environments, clandestine supply chain monitoring, applications to obtain "patterns of life and behavior" data, etc.); (ix) with the help of the tracking device's waveforms (e.g., waveforms that are able to hide in plain sight and piggyback on existing commercial transmissions) and DTN methods (e.g., by leveraging DTN's "two-way, different ways" capability), provide high-performance in contested communication environments with congested spectrum (because, for example, by sending a part of a message across multiple links and allowing the Bundle Protocol based network to reassemble the message at the destination, the traffic cannot be intercepted); (x) provide detailed information (e.g., presence data, state data, pattern data of nearly every route and logistics system, etc.) to the customers so that the customers may know exactly where their containers/boxes are (both full or empty); (xi) prevent tampering, re-routing of cargo, and/or contraband events; (xii) provide real-time and ad-hoc global communication; (xiii) provide event trigger and real-time alerting; (xiv) (visually) look identical to stock parts of IC A (300) so that the tracking device capabilities may be installed in places where the presence of the tracking device would be detrimental to the business or mission (e.g., commercial vehicle fleets, industrial equipment, law enforcement applications, etc.); and/or (xv) provide supply chain logistics, security, and assurance for the customers.

In one or more embodiments, each component of IC A (300) shown in FIG. 3.1 (and FIG. 3.2) may be designed by considering geographic factors of IC A's possible locations around the world and/or custom requirements of the customer/user. The factors and requirements may include, for example (but not limited to): a hurricane rating of a location, a required number of power supplies to support an operation, a required number of physical devices/components in the IU (320) and/or in the CU (310), a required input power frequency, a required input voltage, etc.

In one or more embodiments, the CU (310) and the IU (320) are oriented in a same direction, in which the CU (310) may be attached to, or detached from IC A wall (e.g., a metallic wall, a steel wall, etc.) along the same direction as the IU (320).

Turning now to FIG. 3.2, FIG. 3.2 shows a diagram of an IC (IC A (300)) in accordance with one or more embodiments disclosed herein. IC A (300) may be an example of an IC discussed above in reference to FIG. 1. Comparing to IC A (300) discussed in FIG. 3.1, in one or more embodiments, IC A (300) may only include the CU (310) (as being the tracking device (refer to FIG. 3.1 for details)) without a paired IU (e.g., 320, FIG. 3.1). In this manner, a customer may not need to have a full set of internal sensors (e.g., 384, FIG. 3.4) to track IC A (300) (e.g., the CU (310) may provide detailed information to the customer so that the customer may know exactly where IC A is (both full or empty)). IC A (300) may include additional, fewer, and/or different components without departing from the scope of the embodiments disclosed herein. Each component may be operably connected to any of the other component via any combination of wired and/or wireless connections (where battery/power supply connections of the related components not shown for clarity).

While FIG. 3.2 shows a configuration of components, other IC configurations may be used without departing from the scope of the embodiments disclosed herein.

Turning now to FIG. 3.3, FIG. 3.3 shows a detailed view of the CU (310) in accordance with one or more embodiments disclosed herein. The following discussion includes one or more functionalities provided by the CU (310).

In one or more embodiments, the CU (310) may host, at least, a CU proximity wireless communication module (332), a CU power supply unit (336), a CU power management module (338), a CU processor (340), and a CU communications manager (342).

In one or more embodiments, the CU (310) may provide direct-to-sky communication with commercial telecom providers and may provide an interface for the IU (e.g., 320, FIG. 3.4) to the unique, local tracking device mesh network (which includes one or more tracking devices) in situations where a direct link cannot be established between the IU and telecom. The CU (310) may include an integrated set of communication elements/modules (e.g., a CU SATCOM module (344), a CU cellular module (346), a CU Wi-Fi module (348), a CU proximity RF module (350), a CU GPS module (352), etc.) supporting, at least, global commercial cellular, Wi-Fi, GPS, and SATCOM networks, as well as the local tracking device mesh network. In one or more embodiments, commercial networks/links may provide connectivity to the world's telecom providers, while the local tracking device mesh network provides connectivity between IUs in close proximity (e.g., tens to hundreds of meters) via RF and/or proximity wireless communication channels, for example, sending obtained sensor data to a second IU so that the second IU may provide the sensor data to the management infrastructure (e.g., 140, FIG. 1).

In one or more embodiments, the communication environment for tracking devices in the field may provide one or more obstacles. For example, while ICs in transit via rail or truck are stacked singly or in "double stacks", the ICs are often stacked several deep in the holds of cargo ships or while waiting for routing and shipment at ports and/or cargo transfer points/yards, which may prevent one or more ICs' direct sky visibility (e.g., direct-to-sky communication capabilities). As yet another example, the stacks of steel "boxes" and narrow spacing between them may generate a difficult environment for RF communication with many reflections, multipath interference, and/or strong signal attenuation, in which the conventional "proximity area networks" and techniques developed for most IoT devices may not operate in this environment.

To overcome the aforementioned issues, tracking devices may communicate using the local tracking device mesh network, which may be established through several proximity RF techniques (e.g., via communication modules) and/or proximity wireless communication channels (e.g., via proximity wireless communication modules). In one or more embodiments, CUs may provide low-frequency RF capabilities that are optimized for noisy, challenged spectrum because low frequencies may penetrate tight gaps and narrow spacing between metal objects where higher frequencies (e.g., 2.4 gigahertz (GHz) and 5.8 GHz Wi-Fi bands, Ka-bands used by commercial SATCOM modules, etc.) may not. A tracking device's use of path diversity in terms of both routing pathways and communications channels greatly increases the likelihood of the tracking device being able to communicate when other devices that rely on a single communication channel would be blocked.

In most cases, conventional data transmission techniques may operate to maximize data transmission speeds, in which the embodiments of the present disclosure seek to maximize the reliability of data transmission (e.g., which is more about the connection being achievable than the maximum data rate that may be transmitted). To this end, one or more embodiments may employ modulations and channel coding techniques that may not be spectrally efficient but operates well in a resource constrained, low signal-to-noise environment. As such, the tracking device's RF components may operate at low frequencies using simple, low-power, and high-SNR modulations (e.g., the frequency shift keying (FSK) modulation, the residual carrier modulation, etc.). In one or more embodiments, applying newer signal processing techniques to low-SNR optimized modulations allows the tracking device to pull the signal from the noise where conventional techniques are unable to close a link.

As discussed above, the embodiments of the present disclosure involves the use of RF communication highly disruption/multipath/interference tolerant protocols to communicate through the structure of IC A (e.g., 300, FIG. 3.1). This allows for direct communication among the CU (310), the IU (e.g., 320, FIG. 3.2), and units placed on other nearby ICs without requiring physical cabling or modification of the structure of IC A. For example, the CU (310) and the IU (e.g., 320, FIG. 3.2) may communicate via RF signals that propagate around and through the structure of IC A with some RF energy passing through one or more fine gaps of IC A as well as a wooden floor of IC A (which is standard on all ICs). While attenuated, enough signal strength passes (i) from the outside (of IC A) to the inside (of IC A) and (ii) from the inside (of IC A) to the outside (of IC A) to establish a communication link.

Further, the embodiments of the present disclosure ensure that RF modulation, link layer framing, forward error correction, and RF channel management of a corresponding communication protocol operate in such a way that disruptions caused by, for example, multipath, fading, weak signal strength, and mobility are managed and adapted to (accordingly). As described throughout the present disclosure, the DTN and application layers provide reliable command, telemetry, and data transfer. This combination provides a reliable, low-power, moderate data rate, bidirectional connection between the IU (e.g., 320, FIG. 3.2) and the CU (310). Additionally, proximity communication between CUs on different ICs (e.g., via corresponding CU proximity wireless/RF communication modules) as well as IUs inside different IUs (e.g., via corresponding CU proximity communication modules and/or IU proximity RF modules) is supported at ranges up to several hundred meters using a mesh RF and network topology.

The embodiments of the present disclosure may implement the LoRa wireless protocol (developed by the LoRa alliance) and/or may implement other possible protocols to provide functionalities of a tracking device described throughout the disclosure (e.g., corresponding proximity wireless communication modules (332, 381) of the tracking device may implement/use the LoRa wireless protocol). Specifically, the LoRa wireless protocol uses a chip spread spectrum (CSS) modulation that is highly tolerant to link effects, such as fading, congestion, multipath, etc. The LoRa wireless protocol is optimized for transmission of small chunks of low-BW data (as opposed to conventional network and wireless protocols such as Bluetooth, Wi-Fi, ZigBee, etc., that optimize transmission of streams of data or high-rate information), which is ideally suited for the purpose of communicating short commands, telemetry, and sensor data among ICs (e.g., CUs-CUs, IUs-IUs, etc.) and from the inside of ICs to the outside of ICs (e.g., CU-IU of each of the ICs).

As discussed above, an IC may be constructed out of steel, which makes it difficult (but not impossible) for RF signal penetration (e.g., a signal may refer to message (or digital data) going out to (or coming in from) the management infrastructure (e.g., 140, FIG. 1) such as housekeeping and telemetry data (e.g., position data from a GPS sensor, temperature data, humidity data, door state data, an imagery taken by a camera, etc.), a command, etc.), for example, through its walls. While some RF energy at appropriate frequencies may leak out of the IC, the majority of the RF energy is trapped by the Faraday cage of the "closed" IC. To overcome this issue, one or more embodiments may employ (i) a low-frequency RF communication channel (via low-power proximity RF modules (e.g., 350, 380 (FIG. 3.4), etc.) included in each of the IU and the CU) and/or (ii) a proximity wireless communication channel (which may also be a low-frequency RF communication channel) (via proximity wireless communication modules (e.g., 332, 381 (FIG. 3.4), etc.) included in each of the IU and the CU (that use, for example, connection-oriented transport services (COTS))). This allows communication from the inside of the IC to the outside via paired IU and CU, as well as a "mesh network" to be established between the tracking device units in proximity in the hold of a ship or an IC stack at a port facility.

For example, between multiple ICs of a stack, there may not be a good physical connection between the IC on top of the stack and the IC at the bottom of the stack (e.g., depending on how the mounting brackets are attached, how the clamps are locked, etc.), which may indicate there is not enough solid physical/mechanical connection to have a communication channel up and down along the stack. If this is the case, the corresponding tracking devices may communicate over (i) a low-frequency RF communication channel via the corresponding proximity RF modules and/or (ii) a proximity wireless communication channel via the corresponding proximity wireless communication modules.

In one or more embodiments, the CU (310) may be enclosed in a weather resistant package designed to replicate air vents on standard ICs and may be mounted in a protected region on IC A's (e.g., 300, FIG. 3.1) side walls (e.g., located in the gap between structural ribs). To preserve power and reduce network traffic, the CU (310) may operate in a "receive only" mode for most of the time. Upon an alert triggering event (from the IU processor (e.g., 364, FIG. 3.3) and/or the management infrastructure (e.g., 140, FIG. 1)), for example, the CU (310) may switch to a transmit mode for its pair (i.e., the IU) for periodic reporting of data. An alert triggering event may be (or may include), for example (but not limited to): a "wake up" request from the management infrastructure (e.g., 140, FIG. 1), an internal telemetry event (e.g., a detected failure/fault that needs to be notified before the corresponding component crashes, an unexpected amount of gas detection, above threshold temperature detection, out of range humidity detection, etc.), opening of IC A's door, etc.

In one or more embodiments, the CU power supply unit (336) and the CU power management module (338) may be used to power immediate communications and/or to charge a local battery in the CU power supply unit. In this manner, the CU (310) may achieve a long, maintenance free service life, which is also available to the IU (see FIG. 3.4).

In addition to one or more communication paths that execute among tracking devices in proximity, a tracking device may connect to the network (e.g., 130, FIG. 1) using commercial cellular, Wi-Fi, and/or SATCOM services (for example, with the help of the CU communications manager (342)). At a given density and with a predetermined placement of tracking device enabled ICs (e.g., arranged by the carriers and/or shippers who contracted for the service), CUs/IUs may establish enough connectivity that tracking devices "buried deep" in an IC stack are able to, through the tracking device mesh network (see FIG. 2), reach one or more tracking devices that have connectivity to commercial telecom and/or commercial SATCOM, and from there across the terrestrial Internet to the management infrastructure (e.g., 140, FIG. 1).

In one or more embodiments, the CU power supply unit (336) may refer to a physical device (e.g., a power generator) designed to and configured to provide operational electricity or electrical power (which may include alternating current (AC) electricity, direct current (DC) electricity, or a combination thereof) to one or more CU hardware components (e.g., the CU processor, the CU communications manager (342), etc.). To that extent, via the CU power management module (338), the CU power supply unit (336) may include functionality to convert or step-down AC or DC high-voltage to one or more DC low-voltages required and regulated for stable operation of the CU (310). Further, the CU power supply unit (336) may include circuitry (e.g., rectifiers, voltage dividers, voltage regulators, etc.) necessary to perform any electrical power conversions.

In one or more embodiments, the CU power management module (338) may represent an infrastructure configured for intelligent power distribution management. To that extent, the CU power management module (338) may include functionality to pool and allocate or distribute primary, as well as reserve, electrical power, as needed, to the hardware components of the CU (310). Power allocation may be driven by ML based analytics. For example, when the CU SATCOM module (344) needs to be activated, the CU power supply unit (336) may be instructed (e.g., by the CU power management module (338)) to distribute power to the CU SATCOM module (344).

Further, electrical power supplied from the CU power supply unit (336) to the hardware components may be facilitated through any directly connected, cabled solution configured for electrical power transfer. More specifically, the cabled solution (e.g., electrical cable, power whip, etc.) may refer to any assembly of one or more conductive wires (also referred to as electrical conductors) used for the transmission of electricity over short and/or long distances.

As used herein, a "cable" includes any cable, conduit, or line that carries one or more conductors and that is flexible over at least a portion of its length. A cable may include a connector portion, such as a plug, at one or more of its ends.

In many cases, the CU (310) may be configured with multiple backup power resources (e.g., batteries) for various reasons, for example (but not limited to): to support power redundancy, to support an interrupted service, etc.

In one or more embodiments, the CU power supply unit (336) may include a small, high-capacity, rechargeable battery. The battery may provide localized charge storage for the CU (310) while the CU power management module (338) may provide telemetry (e.g., state of charge, temperature of battery cells, health of the battery, etc.) and charge/discharge management functions for the associated battery (for not overcharging or undercharging the battery).

As the CU (310) is external to the corresponding IC and contained in a small form factor "vent" enclosure, there may be not sufficient volume to allow for a battery with sufficient capacity to operate for the duration of the tracking device's service-free life. To this end, in one or more embodiments, the CU power supply unit (336) may provide local power to the CU. In this manner, there is no need for a large battery to be integrated into the CU (310). Rather, the CU power supply unit (336) maintains only enough power to operate the CU hardware components on an "as-needed" and "on-demand" basis.

In one or more embodiments, the battery itself may be a commercially manufactured, rechargeable cell stack selected for high-charge capacity, high-charge cycle life, and maritime/industrial shipping safety requirements. The specific battery chemistry may include, for example (but not limited to): lithium ion, nickel cadmium, lithium polymer chemistries, etc.

In one or more embodiments, the CU power management module (338) may provide the charge/discharge management and battery capacity telemetry information which may be necessary to maintain sufficient battery capacity and optimize battery cell lifetime. As rechargeable battery life degrades with time (e.g., decreased charge capacity per recharge cycle, decreased total charge capacity, etc.), the number of charge/discharge cycles may be vital. Additionally, certain battery chemistries may require different charge/discharge curves in order to optimize lifetime. The CU power management module (338) may further provide the required insight into the battery state and may control the charge and discharge (e.g., when operating the CU communications manager (342)) characteristics of the battery to maximize the battery lifetime. The CU power management module (338) may also provide health and status monitoring and may alert the CU processor (340) in the event of a failure condition (e.g., a critical fault in the battery).

One of ordinary skill will appreciate that the CU power supply unit (336) may perform other functionalities without departing from the scope of the embodiments disclosed herein. The CU power supply unit (336) may be implemented using hardware (e.g., an integrated circuit), software, or any combination thereof.

Further, one of ordinary skill will appreciate that the CU power management module (338) may perform other functionalities without departing from the scope of the embodiments disclosed herein. The CU power management module (338) may be implemented using hardware (e.g., an integrated circuit), software, or any combination thereof.

In one or more embodiments, the CU processor (340) (e.g., one or more processor cores, one or more processor micro-cores, etc.) may be communicatively coupled to the CU proximity wireless communication module (332), the CU communications manager (342), and the CU power management module (338) (for management and/or data exchange purposes) via any suitable interface, for example, a system interconnect including one or more system buses (operable to transmit communication between various hardware components) and/or peripheral component interconnect express (PCIe) bus/interface. In one or more embodiments, the CU processor (340) may be configured for executing machine-executable code like a CPU, a programmable logic array (PLA), an embedded device such as a System-on-a-Chip (SoC), or hardware/software control logic.

More specifically, the CU processor (340) may include any system, device, or apparatus configured to interpret and/or execute program instructions and/or process data, and may include, without limitation, a low-power embedded field programmable gate array (FPGA) (which may allow for various operating modes and over-the-air configuration/update, including a sleep mode, a low-power mode, a power mode, a diagnostics/maintenance mode, etc.), a microprocessor, a microcontroller, a digital signal processor (DSP), an ASIC, a storage/memory source (comparing to the storage/memory source of the IU processor (e.g., 364, FIG. 3.4), it may not have a deep/large capacity buffer), and/or any other digital or analog circuitry configured to interpret and/or execute program instructions and/or process data.

In one or more embodiments, the CU processor (340) may include functionality to, e.g.,: (i) by its "inbound communication event watchdog" component, manage power state of the CU (310) with a low background power usage (e.g., to save power, the CU may get into a sleep (or stand-by) state and when there is an input (e.g., inbound communication request) from outside (e.g., the management infrastructure (e.g., 140, FIG. 1) pings the CU), the watchdog wakes up the CU (310)); (ii) when necessary, communicate with other components of the CU; (iii) manage communication electronics/hardware included in the CU communications manager (342) (e.g., providing the local hardware/software driver level interfaces to various radios/components included in the CU (310)); (iv) interpret and/or execute program instructions and/or process data stored in a storage/memory resource of the CU (310); (v) utilize the CU communications manager (342) to communicate with other entities in the system (e.g., 100, FIG. 1) to manage (e.g., instantiate, monitor, modify, etc.) one or more components of the CU (310); (vi) manage operation of hardware components of the CU (310) based on a model (e.g., a data protection model, an encryption model, a workload performance availability model, etc.), in which the CU processor may instantiate redundant performance of workloads for high-availability services; (vii) take into account an importance of completion of workloads when preparing and presenting resources (e.g., the data CU processor may over allocate resources for performance of the workloads); (viii) in conjunction with the CU power management module (338), provide CU battery charge management (e.g., managing the charge state of the CU battery); and/or (ix) provide fault detection, isolation, and recovery (FDIR) (e.g., providing a FDIR capability to transmit health and status telemetry of the tracking device to the management infrastructure, including tracking device status and condition telemetry, notification of fault conditions and failure trends, immediate alerting of conditions indicative of malicious attacks (e.g., removal of the CU from the container by a sledgehammer), etc.).

While the CU processor (340) has been illustrated and described as including a limited number of specific components, the CU processor (340) may include additional, fewer, and/or different components without departing from the scope of the embodiments disclosed herein.

One of ordinary skill will appreciate that the CU processor (340) may perform other functionalities without departing from the scope of the embodiments disclosed herein. The CU processor (340) (and its components) may be implemented using hardware, software, or any combination thereof.

In one or more embodiments, the CU communications manager (342) may include functionality to, e.g.,: (i) manage/provide network protocols (e.g., to provide network-layer functionality such as addressing/naming and route detection); (ii) manage/provide link layer protocols/link interfaces (e.g., to provide management of individual communication links, where each module (e.g., the CU SATCOM module (344), the CU cellular module (346), etc.) requires its own set of link layer protocols); (iii) when necessary, communicate with other components of the CU (310); (iv) perform communication link establishment and management (e.g., detection of incoming connections/requests via receivers, detection of incoming data/messages via the receivers, activation of related transmitters when outgoing data is queued for transmission, etc.) via the corresponding communication module (e.g., 344, 346, etc.) (which includes the receivers and transmitters); (v) provide communication message gateways (e.g., a simple router/switch function may be provided to determine which communication path has received an inbound data, to select the appropriate communication path for outbound data (e.g., either long-range via a cellular path and/or a SATCOM path for long-range communication, a Wi-Fi path and/or low frequency RF path for short-range communication, etc.)); and/or (vi) coordinate with the IU (e.g., providing communication, command, and/or control coordination functionalities between the CU and IU via the communication channel (with the help of, for example, the CU proximity wireless communication module (332)), including passing inbound/outbound message traffic, informing the IU of available communication links for DTN route mapping (e.g., knowing where the next available bundle agent is, knowing where the next available DTN node is, etc.), exchanging CU/IU health and status telemetry messages, etc.).

In one or more embodiments, each module of the CU communications manager (342) may provide/support one or more protocols, for example (but not limited to): the UDP (e.g., to support a Wi-Fi link layer, a cellular link layer, etc.), the LTP (e.g., to support a proximity RF link layer, a SATCOM link layer, a Wi-Fi link layer, etc.), etc. Further, the CU communications manager (342) may include/support one or more link layers, for example (but not limited to): a Wi-Fi link layer, a cellular link layer, a TD mesh link layer, a SATCOM link layer, etc.

In one or more embodiments, when two or more components are referred to as "coupled" to one another, such term indicates that such two or more components are in electronic communication or mechanical communication, as applicable, whether connected directly or indirectly, with or without intervening components.

Further, the CU communications manager (342) may provide (i) a link layer between data interfaces (e.g., the SATCOM link layer, the Wi-Fi link layer, the cellular link layer, etc.) and (ii) physical modulation, demodulation, transmission, and/or reception of signals over RF functionalities. To this end, the CU communications manager (342) may include the communications channel physical layers/modules (e.g., a set of dedicated, externally faced radios and networking electronics that provide physical and link layer communications across the various communication paths available to the tracking device), for example (but not limited to): the CU proximity RF module (350) (as a pair with the tracking device mesh link layer, which includes an RF exposed antenna (e.g., a custom local proximity, low-frequency RF modem) for low-frequency RF mesh network communications (e.g., for local proximity IC mesh network communications among ICs in a stack, for unique inter-unit communications via proximity RF)); the CU SATCOM module (344) (as a pair with the SATCOM link layer, which includes an RF exposed antenna for commercial SATCOM); the CU Wi-Fi module (348) (as a pair with the Wi-Fi link layer, which includes an RF exposed antenna for commercial telecom); etc.

The CU (310) may use whatever communication paths are immediately available for a long-range communication (e.g., beyond a few tens of meters), a Wi-Fi path (if offered), a cellular path, a SATCOM path, and/or other over-the-air communication paths may be used. For example, many shipping providers, logistics companies, warehouse operators, and/or port operators may support Wi-Fi throughout their ships, buildings, and/or yards as a routine part of their business and crew operations, in which, if offered, the Wi-Fi path may be used. As yet another example, cellular service is nearly universal at populated areas (and even several miles offshore) such that the CU (310) may have a readily available, always on, WAN for communication purposes. In addition, several commercial telecom providers are deploying satellite based cellular services which are compatible with terrestrial networks. Once available, the tracking device will be able to utilize these global cellular networks as well.

However, in some cases, a cellular service may not be available, especially in sparsely populated regions, in mountainous regions, and/or while at sea. To provide global communication coverage, commercial SATCOM link may be used, in which sufficient data links may be established with a low earth orbit (LEO), geostationary earth orbit (GEO) constellation and/or a medium earth orbit (MEO) constellation using the CU SATCOM module (344). In this manner (e.g., with the help of the SATCOM link), a tracking device (i) may achieve increased reliability, and (ii) may perform low-SNR and low probability of intercept/low probability of detection (LPI/LPD) modulations.

More specifically, the SATCOM link may provide globally available short message services via commercial LEO and/or MEO satellites. Message traffic may be broken into one or more "short messages" and transmitted to the satellite network for forwarding to management infrastructure (e.g., 140, FIG. 1). Inbound data/messages from a SATCOM network may be similarly received by the CU SATCOM module (344) and re-assembled by the CU processor (340) prior to routing to the IU (e.g., 320, FIG. 3.1). As described above, the CU SATCOM module may include, at least, an externally facing non-directional RF exposed antenna (contained within the CU enclosure) and a short coaxial cable. The CU SATCOM module (344) may operate in a low-power mode, in which it remains passive awaiting a message from the SATCOM network. Upon receipt of a message, the CU SATCOM module (344) may wake up and notify the CU processor of the inbound communication. Data transmission may require full power to the CU SATCOM processor, and so the "operation" mode may be limited to those periods when SATCOM transmission is required.

In one or more embodiments, similar to the CU proximity wireless communication module (332), the CU Wi-Fi module (348) may provide a short-range (e.g., tens to hundreds of meters), point-to-point connectivity/communication using the IEEE 802.11 standards. The CU Wi-Fi module (348) may provide a connection between the tracking device units on other containers in proximity (where an RF connection may be more practical) as well as to shipboard and facility operated Wi-Fi networks that are exposed to the corresponding tracking device. The CU Wi-Fi module may be a self-contained component that all RF and protocol handling electronics are integrated, requiring only power, a control/messaging interface, and a connection to an externally facing non-directional RF exposed antenna (contained within the CU enclosure). The CU Wi-Fi module may operate in a mesh configuration allowing establishment of links between known Wi-Fi access points as well as between other CUs in proximity in an ad-hoc manner. Once a connection is established, a high-rate, bidirectional session may exist allowing for exchange of queued information, remote operation, and/or updates. If a route is available from the local Wi-Fi subnet to the management infrastructure (e.g., 140, FIG. 1), near real-time interaction with the tracking device may be achieved.

In one or more embodiments, the CU cellular module (346) may provide a medium range (e.g., hundreds of meters), point-to-point connectivity between the tracking device and commercial cellular networks. The CU cellular module (346) may be a self-contained component, requiring only power and control interfaces as well as a connection to an externally facing non-directional RF exposed antenna (contained within the CU enclosure). A commercially available subscriber identity module (SIM) card may also be required. The CU cellular module (346) may further provide international cellular communication using 4G and/or 5G networks. The CU cellular module (346) may also provide a communication directly between the tracking device and the management infrastructure (e.g., 140, FIG. 1), and may support high-bandwidth communication (when needed). Due to the nature of cellular networks, the CU cellular module may consume excessive power (when active), so management of communication should be provided by the CU processor (340). Either on a predetermined schedule (or upon a communication request via a separate channel), the CU processor (340) may activate the CU cellular module (346), establish a connection to available cellular services, and/or connect to the management infrastructure (e.g., 140, FIG. 1). Once completed, tracking device health and status telemetry may be forwarded to the management infrastructure, followed by a two-way communication session during which any queued information is transmitted, the tracking device is remotely managed, operated in real-time, or updated.

In one or more embodiments, the CU proximity "RF" module (350) may be a full custom design component. The CU proximity module (350) may provide bidirectional, proximity RF wireless connection among multiple CUs in an ad-hoc manner (e.g., for low-frequency RF mesh network communications among ICs in a stack). The CU proximity module's waveform and protocol may be optimized for a low-SNR, high-interference environment as is expected in a stack of ICs where multipath reflections, signal fading, and limited propagation will be severe. As such, rather than using conventional communication techniques that are optimized for high-SNR, high-BW channels (e.g., 4G, 5G, Wi-Fi, direct SATCOM, etc.), the CU proximity module (350) may leverage communication techniques that strive to ensure information exchange "below the noise" with an albeit limited BW. Rather than using quadrature phase shift keying (QPSK), eight phase shift keying (8PSK), or quadrature amplitude modulation (QAM) methods (which are BW efficient but require a clear channel and high-SNR), the CU proximity module may use frequency modulation frequency-shift keying (FM-FSK) and tone modulation methods.

In a low-noise channel, FM-FSK and tone modulation methods may support reasonable BWs, but the modulation symbol rate may be decreased as needed to improve channel capacity by integrating the modulation signal over time. In most cases, in a low-SNR environment, it may be difficult to distinguish signal modulation symbols from random noise, where symbol energy is coherent while noise energy is incoherent. The CU proximity "RF" module (350) may take advantage of this by integrating received energy across a time varying interval (e.g., because noise power is incoherent, it may decrease as the number of samples squared; because signal power is coherent, it may increase as the number of samples squared; etc.). This indicates that the longer the samples of a noisy signal including modulated symbols are integrated, the more the symbol energy to noise power improves.

This technique may theoretically resolve a modulation symbol in nearly infinite noise power (e.g., as long as the symbol is transmitted long enough and is integrated over a large enough set of samples). In practice, a physically realizable and useful system will have a limited ability to resolve symbols in the presence of noise as an infinite integration period is not achievable; however, sample integration may provide the ability to "pull signals from the noise" at levels that direct non-integrated demodulation cannot achieve. The CU proximity RF module (350) may leverage this by allowing the two communicating CUs to vary the symbol rate and integration time across a given channel, effectively "dialing back" the information rate until a solid link is maintained. This may be an inefficient modulation method; however, it provides the ability to communicate in a high-loss, low-SNR environment (e.g., an expected environment in a stack of ICs without a clear view of the sky or each other).

In one or more embodiments, a "direct-to-sky" communication (via its communications manager) may be provided by the IU (e.g., 320, FIG. 3.1) when available such as during periods when IC A's door is open. The IU may also communicate with other IUs in an IC stack using a proximity wireless communion channel/link/path with or without a paired CU. This provides a measure of assured communication in the event of a failure of a paired CU or malicious removal or damage to the CU (e.g., to prevent tracking capabilities of the tracking device).

While the CU communications manager (342) has been illustrated and described as including a limited number of specific components, the CU communications manager (342) may include additional, fewer, and/or different components without departing from the scope of the embodiments disclosed herein.

One of ordinary skill will appreciate that the CU communications manager (and its aforementioned modules) may perform other functionalities without departing from the scope of the embodiments disclosed herein. The CU communications manager (and its aforementioned components) may be implemented using hardware, software, or any combination thereof.

In one or more embodiments, the CU proximity wireless communication module (332) may be a full custom design component that provides a short-range (e.g., tens to hundreds of meters), bidirectional, proximity wireless (or RF) communication connection among multiple CUs and/or IUs in an ad-hoc manner (e.g., for low-frequency RF mesh network communications among ICs in a stack). This allows for direct communication among the CU, the IU, and units placed on other nearby ICs without requiring physical cabling or modification of the structure of IC A. As is expected in a stack of ICs where multipath reflections, signal fading, and limited propagation will be severe, the CU proximity wireless communication module (332) may implement the LoRa wireless protocol, where this protocol implements LoRa signal modulation, link coding, and RF channelization protocols. This may be implemented using a COTS LoRa chipset that is integrated into the CU processor (340).

The CU proximity wireless communication module (332) may be a self-contained component that all protocol handling electronics are integrated, requiring only power, a control/messaging interface, and a connection to an externally facing non-directional exposed antenna (contained within the CU enclosure). The CU proximity wireless communication module (332) may operate in a mesh configuration allowing establishment of links between known access points as well as between other CUs in proximity in an ad-hoc manner. Once a connection is established, a bidirectional session may exist allowing for exchange of queued information, remote operation, and/or updates. If a route is available from the local subnet to the management infrastructure (e.g., 140, FIG. 1), near real-time interaction with the tracking device may be achieved.

While FIG. 3.3 shows a configuration of components, other configurations may be used without departing from the scope of the embodiments disclosed herein. For example, the CU communications manager (342) may not include the CU Wi-Fi module (348) to provide its functionalities.

Turning now to FIG. 3.4, FIG. 3.4 shows a detailed view of the IU (320) in accordance with one or more embodiments disclosed herein. The following discussion includes one or more functionalities provided by the IU (320).

In one or more embodiments, (i) the instrumentation package (326) (which is the "brain component" of the tracking device) includes, at least, an IU processor (364), a DTN module (366), and any number of IU sensors (384) and (ii) the BPC (358) includes, at least, an IU power supply unit (360) and an IU power management module (362).

In one or more embodiments, the IU power supply unit (360) may refer to a physical device (e.g., a power generator) designed to and configured to provide operational electricity or electrical power (which may include AC electricity, DC electricity, or a combination thereof) to one or more IU hardware components (e.g., the IU processor (364), the IU communications manager (372), etc.). To that extent, via the IU power management module (362), the IU power supply unit (360) may include functionality to convert or step-down AC or DC high-voltage to one or more DC low-voltages required and regulated for stable operation of the IU (320). Further, the IU power supply unit (360) may include circuitry (e.g., rectifiers, voltage dividers, voltage regulators, etc.) necessary to perform any electrical power conversions.

In one or more embodiments, the IU power management module (362) may represent an infrastructure configured for intelligent power distribution management. To that extent, the IU power management module (362) may include functionality to pool and allocate or distribute primary, as well as reserve, electrical power, as needed, to the hardware components of the IU (320). Power allocation may be driven by ML based analytics. For example, when the IU communications manager (372) needs to be activated, the IU power supply unit (360) may be instructed (e.g., by the IU power management module (362)) to distribute power to the IU communications manager (372).

Further, electrical power supplied from the IU power supply unit (360) to the hardware components may be facilitated through any directly connected, cabled solution configured for electrical power transfer. More specifically, the cabled solution may refer to any assembly of one or more conductive wires (also referred to as electrical conductors) used for the transmission of electricity over short and/or long distances. In many cases, the IU (320) may be configured with multiple backup power resources (e.g., batteries) for various reasons, for example (but not limited to): to support power redundancy, to support an interrupted service, etc.

In one or more embodiments, the IU power supply unit (360) may include a high-capacity, single use battery pack (and the corresponding power management hardware components), in which the IU power supply unit (360) may be hosted in a ruggedized housing designed for operation in an industrial/maritime environment. The battery pack is a removable component for exchange in the field if required. Further, the battery pack may provide localized charge storage for the IU (320) while the IU power management module (362) may provide telemetry (e.g., state of charge, temperature of battery cells, health of the battery, etc.) and charge/discharge management functions for the associated battery pack (for not overcharging or undercharging the battery).

In one or more embodiments, a battery of the battery pack may be a commercially manufactured, rechargeable cell stack selected for high-charge capacity, high-charge cycle life, and maritime/industrial shipping safety requirements. The specific battery chemistry may include, for example (but not limited to): lithium ion, nickel cadmium, lithium polymer chemistries, etc.

In one or more embodiments, the battery pack may refer to a bank of rechargeable battery modules that, when combined, provide a charge capacity suitable for powering the IU (320) for, at least, three years under normal operating conditions (e.g., the pack is sized for three years to allow for a 50% design life margin relative to the tracking device's two-year service-free life, in which the 50% margin may tolerate for normal battery self-discharge rates and the natural degradation of the pack over time).

In one or more embodiments, the IU power management module (362) may provide in-situ charge/discharge management and battery capacity telemetry information (e.g., a battery charge/discharge state, a battery charge capacity, a thermal condition of a battery, etc.) which may be necessary to maintain sufficient battery capacity and optimize battery cell lifetime of the pack. The IU power management module (362) may further provide the required insight into the battery state and may control the charge and discharge characteristics of the pack to maximize the battery lifetime. With the help of its FDIR capability, the IU power management module (362) may also provide health and status monitoring, and may alert the IU processor (364) in the event of a failure condition (e.g., if necessary, disconnecting the malfunctioning battery pack to isolate any individual cells that encounter faults). As indicated, the IU power management module (362) may communicate with the IU processor (364) for command (e.g., the processor may direct the module so that the battery pack can provide more power for an immediate message transmission in an emergency condition) and/or telemetry data exchange, which means power management functions in the IU (320) are shared between the instrumentation package (326) and the BPC (358).

The IU power management module (362) may enable controlled discharging of the battery pack as a whole. Each battery cell in the pack may need to discharge at a separate rate due to varying cell-to-cell manufacturing tolerances and service life degradation. Because the tracking device (including both units) is a high-reliability system, optimizing performance of the battery pack (and the overall power supply unit) is vital. To this end, the IU power management module (362) may provide both individual cell energy state management and battery pack-wide discharge load balancing.

One of ordinary skill will appreciate that the IU power supply unit (360) may perform other functionalities without departing from the scope of the embodiments disclosed herein. The IU power supply unit (360) may be implemented using hardware, software, or any combination thereof.

In one or more embodiments, the IU processor (364) may provide less, the same, or more functionalities and/or services comparing to the CU processor (e.g., 340, FIG. 3.3).

In one or more embodiments, the IU processor (364) may include functionality to, e.g.,: (i) manage all of the housekeeping for the IU (320) (e.g., managing (via its system management, event handler, and data logger components (not shown)), at least, the IU power management module (362), the DTN module (366), and/or the IU sensors (384), managing the execution of operations on those components (e.g., managing services to be provided by the DTN module (366), managing workload placement between a bundle router and a bundle agent (which are component of an IU communications subsystem (370)), tracking sensing and/or resource capabilities of the IU sensors (384), etc.), managing a sensor state policy, etc.); (ii) perform various management/processing/monitoring functions (e.g., event detection and logging based on predetermined trigger thresholds and obtained telemetry/sensor data (e.g., leaving a geofenced area, detection of door open/close, carbon dioxide ($CO_2$) and/or temperature levels exceeding specified levels, presence of radiologic and/or chemical detection, health information of each sensor in the IU, etc.), communication protocol functions/channels, core/commanding functions, etc.) and be responsible for overseeing operations and maintenance pertinent to the hardware, software, and/or firmware components of the IU (320); (iii) implement linear, non-linear, and/or ML models to the obtained supply chain data to generate derived data for further use; (iv) expose management interfaces to interface/integrate with both local tracking device subnetworks and the wider global tracking device network (including the management infrastructure (e.g., 140, FIG. 1)); (v) when necessary, communicate with other components of the IU (320); (vi) manage distribution/allocation of available computing resources against the IU sensors (384); (vii) obtain and track (periodically) resource utilization levels of each IU sensor (by obtaining telemetry data and/or logs) to identify (a) which IU sensor is healthy and (b) which IU sensor is unhealthy (e.g., which IU sensor is slowing down in terms of performance, which IU sensor's resource utilization value is exceeding a predetermined maximum resource utilization value threshold, etc.); (viii) based on (vii), manage health of each IU sensor by implementing a policy as well as load balancing; (ix) identify health (e.g., a current status) of each IU sensor based on average, minimum, and maximum resource utilization values; (x) provide identified health of each IU sensor to other entities (e.g., administrators of the management infrastructure (e.g., 140, FIG. 1)); (xi) automatically react and generate alerts (e.g., a predictive alert, a proactive alert, a technical alert, etc.) if one of the predetermined maximum resource utilization value thresholds is exceeded; (xii) keep track of active and inactive IU components; (xiii) control a lifecycle of each IU sensor; (xiv) in conjunction with the IU power management module (362), perform power operations on the IU's components (e.g., power on, power-off, suspend, resume, checkpoint, etc.); (xv) prevent unauthorized access events directed to the IU (320); (xvi) provide an access control to an IU's component; (xvii) based on sensor data, provide and environmental control for an internal environment of an IC; (xviii) based on sensor data, determine whether or not the internal temperature of the IC is below or above an appropriate operating temperature level (e.g., above 0° C.), and/or (xix) store (temporarily or permanently) information/data (e.g., IU health and status telemetry data, higher-level network and communications protocols (e.g., the Bundle Protocol (in order to handle a disrupted time varying topology of ICs as they move around the world), application and session layer functions, etc.) necessary to connect and communicate via the network (e.g., 130, FIG. 1)) related to (i)-(xviii) in the storage/memory resource of the IU (320).

In one or more embodiments, by its data logger (which includes the required logic and heuristics), the IU processor (364) may provide periodic sampling of the IU sensors (384) to capture sensor data/records with respect to, for example (but not limited to): temperature, position, humidity, chemical detection, imagery, sound, etc. Based on predetermined schedules, the data logger may make any calculations and then log the obtained sensor data (in a storage/memory resource of the IU) for later transmission to the management infrastructure (e.g., 140, FIG. 1). In one or more embodiments, upon detection of triggering events (that are recorded at one or more sensors) and/or a changed recording rate (e.g., a change sound and imagery recording rates from periodic snapshots to full video and audio due to a door opening event).

In one or more embodiments, by its event handler (which includes the required logic and heuristics), the IU processor (364) may (i) provide periodic health and status logging of the IU's components, (ii) perform triggered event detection, and/or (iii) based on (ii) and predetermined thresholds, initiate alerting of the corresponding entities (e.g., the management infrastructure (e.g., 140, FIG. 1)) about a triggered event. For example, the IU processor (364) may check and record a temperature level within the corresponding hourly for later transmission, but may instantly activate video and sound recording (and immediate transmission of alerts including those records) upon detecting a door opening condition (where the IC should be closed or in transit).

The IU processor (364) may provide this functionality/service (including making a determination to "key up" a real-time communication channel) to report a triggering event out of a normal, periodic communication schedule (e.g., providing an immediate "alert" update to the management infrastructure (e.g., 140, FIG. 1) rather than usual, per-hour updates). Additionally, the IU processor (364) may provide this service for other IUs (within the corresponding IC mesh network) that do not have direct connectivity to the management infrastructure (e.g., 140, FIG. 1), thereby relaying an alert update/message for an IU that otherwise would be out of communication.

The IU processor (364) may also generate an alert message for later transmission in the event that no immediate communication channels are available, as would be the case where the corresponding IC is tampered while being out of view (e.g., being inside a sealed building, being inside a tunnel, etc.). The IU processor (364) may trigger an alert based on its own health and status, and experienced tamper conditions associated with the IC (e.g., an intruder opened the IC's door (where an image capture sensor may immediately take pictures of the intruder), an intruder tried to cut a steel wall of the IC, a sudden change in a chemical composition state of air with the IC, etc.). In one or more embodiments, the IU processor (364) may allow most of the other processor components to remain in a sleep mode to conserve power and may wake the related ones upon a detected trigger event (e.g., a fault message received from an IU sensor).

One of ordinary skill will appreciate that the IU processor (364) may perform other functionalities without departing from the scope of the embodiments disclosed herein.

In one or more embodiments, the DTN module/node (366) includes, at least, the IU communications subsystem (370) and the IU communications manager (372). The DTN node (366) may be, for example, a thread, an object in an object-oriented OS, a special-purpose hardware device, etc.

In one or more embodiments, as being part of the IU communications subsystem (370), the bundle agent may include functionality to, e.g.,: (i) perform one or more functions of the DTN Bundle Protocol (e.g., RFC 5050); (ii) handle a bundle assembly; (iii) handle bundle storage; (iv) provide one or more bundle protocol services and execute the procedures of the Bundle Protocol; (v) manage transmission, delivery, and/or processing of data units; (vi) manage bundle protocol service interface; (vii) generate and/or request transmission of administrative records (e.g., status reports, custody signals, etc.); (viii) accept the delivery of and process any received custody signals and/or status reports; (ix) perform one or more functions necessary for a DTN including construction and management of the Bundle Protocol and LTP; and/or (x) implement a convergence layer (e.g., a logical interface) between higher level protocols (e.g., the Bundle Protocol) and physical, non-DTN protocol stacks/channels (e.g., UDP/IP, TCP/IP, etc.).

As described above in reference to FIG. 2, DTN is an end-to-end architecture providing communications in and/or through highly stressed environments. Stressed "networking" environments may include those with intermittent connectivity, large and/or variable delays, and high bit error rates. To provide its services, the Bundle Protocol may sit at an application layer of one or more constituent Internet layers, forming a "store-and-forward" overlay network.

In one or more embodiments, the Bundle Protocol may provide, for example (but not limited to): custody-based re-transmission; ability to deal with intermittent connectivity; ability to take advantage of scheduled, predicted, and opportunistic connectivity (in addition to continuous connectivity); late binding of overlay network endpoint identifiers to constituent Internet address; etc. The Bundle Protocol may use "native" Internet protocols for communications with a given network, in which the interface between the Bundle Protocol and a specific Internet protocol may be called as a convergence layer adapter.

As used herein, a "bundle" may refer to the format of the protocol data units passed between entities (e.g., bundle nodes; a node that may send and/or receive bundles) participating in bundle protocol communication. Said another way, a bundle is a protocol data unit of the DTN Bundle Protocol, in which each bundle may include a sequence of two or more blocks of protocol data. Each bundle may be a concatenated sequence of at least two block structures, in which the first block may be a primary bundle block, and no bundle may have more than one primary bundle block. Additional bundle protocol blocks of other types may follow the primary block to support extensions to the Bundle Protocol (e.g., the bundle security protocol). In one or more embodiments, sensor data, command message, telemetry data, etc., may be included in a bundle as a payload of the bundle.

As being a part of the IU communications subsystem (370), the bundle router may include functionality to, e.g.,: (i) utilize one or more bundle protocol services to manage a communication; (ii) provide routing functions in a bundle protocol based DTN; (iii) serve as a router element in a tracking device mesh network (see FIG. 2); (iv) be leveraged by foreign IUs to route traffic to other foreign IUs across the mesh network independent of the host IU; and/or (v) provide the "store and forward" and bundle message accountability functions of the DTN architecture as well as DTN route management between the tracking devices and the management infrastructure (e.g., 140, FIG. 1) over dissimilar communication channels.

In one or more embodiments, the IU communications manager (372) may include functionality to, e.g.,: (i) manage/provide network protocols (e.g., to provide network-layer functionality such as addressing/naming and route detection); (ii) manage/provide link layer protocols/link interfaces (e.g., to provide management of individual communication links, where each module (e.g., the IU SATCOM module (374), the IU cellular module (376), etc.) requires its own set of link layer protocols); (iii) manage/provide a MANET protocol (e.g., to provide a mesh network node detection, connection establishment, and sharing of routing information); (iv) when necessary, communicate with other components of the IU (320); (v) schedule and controlling the various communication modules and links contained on the IU (320) and remotely by command message contained on the external CU (e.g., 310, FIG. 3.1); (vi) perform communication link establishment and management (e.g., detection of incoming connections/requests via receivers, detection of incoming data/messages via the receivers, activation of related transmitters when outgoing data is queued for transmission, etc.) via the corresponding communication module (e.g., 374, 381, etc.) (which includes the receivers and transmitters); (vii) provide communication message gateways (e.g., a simple router/switch function may be provided to determine which communication path was received an inbound data, to select the appropriate communication path for outbound data (e.g., either long-range via a cellular path and/or a SATCOM path for long-range communication, a proximity wireless communication path and/or low frequency RF path for short-range communication, etc.)); and/or (viii) coordinate with the CU (e.g., providing communication, command, and/or control coordination functions between the CU and IU via the proximity wireless communication path (with the help of the IU proximity wireless communication module (381)), including passing inbound/outbound message traffic, informing the CU of available communication links for DTN route mapping (e.g., knowing where the next available bundle agent is, knowing where the next available DTN node is, etc.), exchanging CU/IU health and status telemetry messages, etc.).

In one or more embodiments, each module of the IU communications manager (372) may provide/support one or more protocols, for example (but not limited to): the MANET protocol, the UDP (e.g., the Bundle Protocol over the UDP, where the Bundle Protocol may use the UDP for communication (as an overlay network) so that the DTN may be overlaid on the UDP; to support a Wi-Fi link layer, a cellular link layer, etc.), the LTP (e.g., the Bundle Protocol over the LTP, similar to the case of UDP, where the Bundle Protocol provides the reliable communication and/or data transfer; to support a proximity RF link layer, a SATCOM link layer, a Wi-Fi link layer, etc.), etc. Further, the IU communications manager (372) may include/support one or more link layers, for example (but not limited to): a Wi-Fi link layer, a cellular link layer, a tracking device mesh link layer, a SATCOM link layer, etc.

Further, the IU communications manager (372) may provide (i) a link layer between data interfaces (e.g., the SATCOM link layer, the Wi-Fi link layer, the cellular link layer, etc.) and (ii) physical modulation, demodulation, transmission, and/or reception of signals over RF functionalities. To this end, the IU communications manager (372) may include the communications channel physical layers/modules, for example (but not limited to): the IU proximity RF module (380) (as a pair with the mesh link layer, which includes an RF exposed antenna for low-frequency RF mesh network communications; the IU SATCOM module (374) (as a pair with the SATCOM link layer, which includes an RF exposed antenna for commercial SATCOM); the IU Wi-Fi module (378) (as a pair with the Wi-Fi link layer, which includes an RF exposed antenna for commercial telecom); etc.

The IU (320) may use whatever communication paths are immediately available for a long-range communication, a Wi-Fi path (if offered), a cellular path, a SATCOM path, and/or other over-the-air communication paths may be used. However, in some cases, a cellular service may not be available, especially in sparsely populated, in mountainous regions, and/or while at sea. To provide global communication coverage, commercial SATCOM link may be used, in which sufficient data links may be established with a GEO constellation and/or a MEO constellation using the IU SATCOM module (374). In this manner (e.g., with the help of the SATCOM link), a tracking device (i) may achieve increased reliability, and (ii) may perform low-SNR and LPI/LPD modulations.

In one or more embodiments, the remaining modules of the IU communications manager (372) (and the IU GPS module (382)) may provide less, the same, or more functionalities and/or services comparing to the "communication" related modules of the CU (e.g., 310, FIG. 3.3).

In one or more embodiments, all the communication options/paths provided by the IU communications manager (372) may be used while the door of IC A (e.g., 300, FIG. 3.1) is open for any reason. In normal operating conditions (e.g., while the door of IC A is closed), the IU (310) may use the CU communications manager (e.g., 342, FIG. 3.3) (and the related link layers) via the proximity wireless communication modules and wireless communication path in between.

As discussed above, the existence of the IU communications manager (372) may not be immediately obvious. For example, when the door of IC A (e.g., 300, FIG. 3.1) is opened (indicating some form of tampering or altering of the shipment), the Faraday cage generated by the steel walls of IC A may be broken, providing an opportunity for the IU communications manager (372) to initiate a communication event (using RF or any available channels/links) at full power and full data rate for the duration of time that the door is open. Additionally, while ICs are generally electrically blocking, manufacturing defects and gaps at joints allow some RF to leak out of the corresponding IC, providing a communication channel when an infrastructure is sufficiently close (such as cell towers in major port facilities or along interstates).

While the IU communications manager (372) has been illustrated and described as including a limited number of specific components, the IU communications manager (372) may include additional, fewer, and/or different components without departing from the scope of the embodiments disclosed herein.

One of ordinary skill will appreciate that the IU communications manager (372) (and its aforementioned components) may perform other functionalities without departing from the scope of the embodiments disclosed herein. The IU communications manager (372) (and its aforementioned components) may be implemented using hardware, software, or any combination thereof.

In one or more embodiments, the IU sensors (384) includes, at least, a GPS sensor (386), one or more special purpose sensors (388), an image capture sensor (390), and one or more environmental sensors (392). As being, for example, a sensing device, each of the IU sensors may be adapted to provide monitoring services. Further, each of the IU sensors may generate sensor data that may be any quantity and types of measurements (e.g., of a scene's properties, of an environment's properties, etc.) over any period(s) of time and/or at any points-in-time (e.g., any type of information obtained from one or more IU sensors, in which different portions of the sensor data may be associated with different periods of time (when the corresponding portions of sensor data were obtained)). The sensor data may then be provided to the IU processor (364) for further processing.

In one or more embodiments, sensor data may be implemented as, for example, a list. Each entry of the list may include information representative of, for example, (i) periods of time and/or points-in-time associated with when a portion of sensor data included in the entry was obtained and/or (ii) the portion of sensor data. The sensor data may have different organizational structures without departing from the scope of the embodiments disclosed herein. For example, the sensor data may be implemented as a tree, a table, a linked list, etc.

In one or more embodiments, the GPS sensor (386) may include functionality to, e.g.,: (i) perform position measurements through GPS receivers integrated in the IU itself as well as through the CU's GPS module (382); (ii) determine points of interest nearby; (iii) determine zoning codes (including state and/or country information); (iv) determine a distance to a transportation system; (v) determine transit times information; (vi) provide worldwide location and time; and/or (vii) provide geofencing capabilities to detect motion of an IC outside a defined area or to detect a variance from a predicted transit path.

One of ordinary skill will appreciate that the GPS sensor (386) may perform other functionalities without departing from the scope of the embodiments disclosed herein. The GPS sensor (386) may be implemented using hardware, software, or any combination thereof.

In one or more embodiments, a special purpose sensor may be, for example (but not): a chemical detection sensor, a biological sensor, a radiation sensor, a sensor that has a full Raman spectroscopy or gas chromatography capability, etc. The special purpose sensor (of the special purpose sensors (388)) may include functionality to, e.g.,: (i) measure/detect the presence of chemicals of interest (e.g., oxygen ($O_2$), $CO_2$, ammonia (the breakdown product of ureic acid), etc.) to, at least, government officials; (ii) detect and characterize arbitrary chemicals in an IC internal atmosphere; (iii) detect the presence of live cargos (e.g., humans, animals, etc.) through changes in the $CO_2/O_2$ concentration in the IC internal atmosphere and/or though the presence of ammonia; (iv) detect the presence of targeted pathogens of interest to, at least, government officials; and/or (v) detect the presence of radiologic and/or nuclear hazards (e.g., detecting the presence of various radiologic isotopes).

One of ordinary skill will appreciate that a special purpose sensor may perform other functionalities without departing from the scope of the embodiments disclosed herein. The special purpose sensor may be implemented using hardware, software, or any combination thereof.

In one or more embodiments, the image capture sensor (390) (e.g., a visual sensor, a camera, an electromagnetic radiation sensor (e.g., an infrared sensor), etc.) may include functionality to, e.g.,: (i) record a position of an IC's door (open/close) (e.g., by operating at visible frequencies so that any change in the door's position (even at night, which may be determined by light detection and infrared imagery) will change the lighting of the scene because a closed/sealed IC generates a totally dark scene); (ii) by operating at infrared frequencies, provide awareness of an IC's contents (where hotspots on a heat map may indicate the presence of humans and/or animals); (iii) obtain optical information (e.g., a pattern of light scattered off of a scene in an IC) regarding a scene); (iv) capture periodic still imagery (e.g., snapshots) of a scene; (v) capture motion imagery (e.g., video) of a scene; (vi) detect near infrared radiation and/or far infrared radiation; and/or (vii) provide surveillance services (e.g., determining object-level information, performing face recognition, etc.) for scenes.

In one or more embodiments, to mitigate against an IC being opened in a truly dark environment (such as indoors) the IU may use an infrared camera to detect the actual opening of the IC door independent of the illumination level.

One of ordinary skill will appreciate that the image capture sensor (390) may perform other functionalities without departing from the scope of the embodiments disclosed herein. The image capture sensor (390) may be implemented using hardware, software, or any combination thereof.

In one or more embodiments, an environmental sensor may be, for example (but not limited to): a temperature sensor, a humidity sensor, a count sensor, a differential pressure/vibration sensor, a corrosion sensor, an audio sensor (e.g., a microphone adapted to obtain auditory information (e.g., a pattern of sound from the scene) regarding a scene), etc. The environmental sensor (of the environmental sensors (392)) may include functionality to, e.g.,: (i) provide awareness of an IC's contents (where digital signal processing methods allow isolation of human/animal characteristics such as breathing, speech, etc.); (ii) operate at normal sound pressure sensitivity levels and at high sound pressure sensitivity levels; (iii) process and detect events based on audio waveform characteristics; (iv) detect a temperature level within the IC; (v) detect fire/smoke within the IC; and/or (vi) suppress fire/smoke within the IC.

One of ordinary skill will appreciate that an environmental sensor may perform other functionalities without departing from the scope of the embodiments disclosed herein. The environmental sensor may be implemented using hardware, software, or any combination thereof.

In one or more embodiments, an IU sensor may include functionality to, e.g.,: (i) capture sensory input (e.g., sensor data) in the form of text, audio, video, touch or motion; (ii) collect massive amounts of data (where, the collected data may be grouped as: (a) data that needs no further action and does not need to be stored, (b) data that should be retained for later analysis and/or record keeping, and (c) data that requires an immediate action/response); and/or (iii) provide captured sensor data to other entities (e.g., the management infrastructure (e.g., 140, FIG. 1) via the IU processor (364)), which may (a) generate a baseline "pattern of life" for the related IC, (b) provide a unique insight into each cargo's state, and (c) be helpful to generate alert triggers that cause an immediate communication to the management infrastructure, enabling the shipper, cargo owner, and/or appropriate law enforcement to respond appropriately.

As described above, with the help of IU sensors (384), the IU (320) may provide one or more sensor fusion capabilities in order to detect the presence or change in state of objects within an IC. For example, the presence of life signs may be detected based on a change within the internal atmospheric composition of the IC (e.g., a decreased $O_2$ level, an increased $CO_2$ level, an increasing presence of ammonia, etc.). As yet another example, digital signal processing capabilities (e.g., implementing Fourier transforms) of the IU processor (364) may reduce an acoustic noise floor from an environmentally captured sound (e.g., sound resulting from ship propulsion, wave action and reveal faint trace signals resulting from respiration and heartbeat, etc.). By performing analyses in the frequency domain (rather than in the time domain), the IU processor (364) may detect signals based on their spectrum signature (where the information in the signal may be contained in its frequency content).

As yet another example, temperature level changes (within the internal environment of an IC) that do not correspond to known environmental conditions (along with the changes in the internal atmospheric composition of the IC) may indicate combustion or reaction occurring in a cargo loaded into the IC. As yet another example, a change in the IC's trajectory (e.g., velocity and position) that does not match the predicted trajectory may indicate smuggling/tampering of a cargo loaded into the IC.

While FIG. 3.4 shows a configuration of components, other configurations may be used without departing from the scope of the embodiments disclosed herein. For example, the IU communications manager (372) may not include the IU Wi-Fi module (378) to provide its functionalities.

FIGS. 4.1 and 4.2 show data collection and transmission by the CU (e.g., 310, FIG. 3.3) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

In FIGS. 4.1 and 4.2, a SATCOM channel and/or a cellular channel are considered as the communication channels; however, embodiments herein are not limited as such. Any other communication channel (with its corresponding communications module) described in the present disclosure may also be considered to implement the method illustrated in FIGS. 4.1 and 4.2.

Turning now to FIG. 4.1, the method shown in FIG. 4.1 may be executed by, for example, the above-discussed CU. Other components of the system illustrated in FIG. 1 may also execute all or part of the method shown in FIG. 4.1 without departing from the scope of the embodiments disclosed herein.

In Step 400, the CU processor (e.g., 340, FIG. 3.3) directs the CU communications manager (e.g., 342, FIG. 3.3) to initiate a communication module (e.g., the CU SATCOM module (e.g., 344, FIG. 3.3), the cellular module (e.g., 346, FIG. 3.3), etc.). In Step 402, the CU communications manager initiates the SATCOM module and/or the cellular module by sending a request to the CU power management module (e.g., 338, FIG. 3.3) to power up the SATCOM module and/or the cellular module. Once the SATCOM module and/or the cellular module are powered up and ready, the CU communications manager may perform appropriate initialization procedures. In one or more embodiments, communications between the (i) SATCOM module and the CU processor and (ii) the cellular module and the CU processor may be performed via bidirectional serial port interfaces.

In Step 404, the communication module establishes a communication link to the management infrastructure (e.g., 140, FIG. 1) over a network (e.g., a satellite network). In one or more embodiments, once powered up, the communication module may search for signals and automatically establish the communication link with the management infrastructure, which results in a communication session.

In one or more embodiments, once the session is established, inbound messages/data may be received and outbound messages may be transmitted. The communication module may provide indications of transmitter and receiver status as well as link telemetry (e.g., carrier power, SNR levels, etc., that are informative about the quality of the established link). The traffic (e.g., inbound data, outbound data, etc.) on the established communication link (e.g., the SATCOM link, the cellular link, etc.) may operate based on the Bundle Protocol (as an overlay over to, for example, TCP/IP), in which the end-to-end security of the communication link may be satisfied by bundle protocol security measures (e.g., encryption, bundle encapsulation, providing security end-to-end and hop-to-hop on a DTN, etc.)

In Step 406, the communication module notifies the CU processor about the established communication link by sending a notification. In Step 408, based on the notification, the CU processor transmits (via the communication module) a request to the management infrastructure requesting a queued/held message/data to be delivered over the link. In response to this request, the management infrastructure may deliver the queued message to the communication module, which then transfers the message (e.g., the inbound traffic) to the CU processor.

In Step 410, upon receiving the message, the CU processor may first extract the message's satellite network message format and then frame the format of the message for transmission to the IU over a proximity wireless communication path/channel (provided by the CU proximity wireless communication module (e.g., 332, FIG. 3.3) and the IU proximity wireless communication module (e.g., 381, FIG. 3.4)) between the CU and the IU. In Step 412, the CU processor provides the framed message to the CU proximity wireless communication module (e.g., the transmitter/receiver of the module) for transmission to the IU via the proximity wireless communication path. Thereafter, the CU proximity wireless communication module may transmit the framed message to the IU (more specifically, to the IU proximity wireless communication module) over the path.

In one or more embodiments, the proximity wireless communication path may enable the CU proximity wireless communication module to send data (or a low-frequency RF signal) to the IU proximity wireless communication module without requiring a physical modification to the IC (IC A) or a cabling between the IU and the CU. Following Step 412, the method proceeds to Step 414 of FIG. 4.2.

Turning now to FIG. 4.2, the method shown in FIG. 4.2 may be executed by, for example, the above-discussed CU. Other components of the system illustrated in FIG. 1 may also execute all or part of the method shown in FIG. 4.2 without departing from the scope of the embodiments disclosed herein.

In Step 414, the CU processor frames "outbound" data received from the IU over the proximity wireless communication path (more specifically, the outbound data that is received from the CU proximity wireless communication module) per the established communication link's protocols to generate framed "outbound" data. In one or more embodiments, the CU proximity wireless communication module may receive the outbound data from the IU proximity wireless communication module over the path, in which the IU proximity wireless communication module may receive the "outbound" data from the IU processor (e.g., 364, FIG. 3.4).

In one or more embodiments, upon receiving the related data, the IU proximity wireless communication module may: (i) convert the data into a low-frequency RF signal and (ii) sends the low-frequency RF signal to the CU proximity wireless communication module using the proximity wireless communication path (that is established through a wall of the IC). Thereafter, upon receiving the low-frequency RF signal, the CU proximity wireless communication module may: (i) convert the low-frequency RF signal to the outbound data and (ii) send the outbound data to the CU processor.

Referring to FIG. 3.1, the CU and the IU may form a tracking device that is mounted to IC A. In one or more embodiments, the CU processor may perform this process once the inbound data (e.g., the framed message) is provided to the IU (see Step 412 of FIG. 4.1).

In Step 416, the CU processor transmits (via the communication module) the framed outbound data to the management infrastructure over the communication link.

In Step 418, upon transmitting the framed data to the management infrastructure, the CU processor makes a determination as to whether the communication link should be terminated. Accordingly, in one or more embodiments, if the result of the determination is YES, the method proceeds to Step 420. If the result of the determination is NO, the method alternatively returns to Step 414.

To perform the determination, the CU processor may query the IU processor to infer if there is any additional outbound traffic/data that needs to be sent to the management infrastructure and/or if the CU processor should hold the communication link open for a bidirectional session between the IU processor and the management infrastructure. If there is queued message traffic from the IU processor, a series of messages may be received by the CU processor from the IU processor (e.g., via the proximity wireless communication path using the related proximity wireless communication modules), framed per the satellite network protocols, and then transmitted to the management infrastructure using the link.

If the IU processor indicates that a bidirectional session is needed, the CU processor may maintain the communication link, pass outbound traffic from the IU processor to the management infrastructure (and/or from the management infrastructure to the IU processor) until the CU processor receives a command from the IU processor to terminate the session or the session times out. If no outbound traffic is queued, the CU processor may terminate the communication link.

In Step 420, as a result of the determination in Step 418 being YES, the CU processor notifies the IU (more specifically, the IU processor via the proximity wireless communication path using the related proximity wireless communication modules) that the communication link is terminated. In Step 422, the CU processor then directs the CU communications manager to manage power consumption in the CU (by powering down the communication module (e.g., until the next scheduled communication)) and to terminate the communication link.

In Step 424, the CU communications manager powers down the communication module, for example, to preserve power in the CU and to terminate the communication link. In one or more embodiments, the method may end following Step 424.

Figure 5:
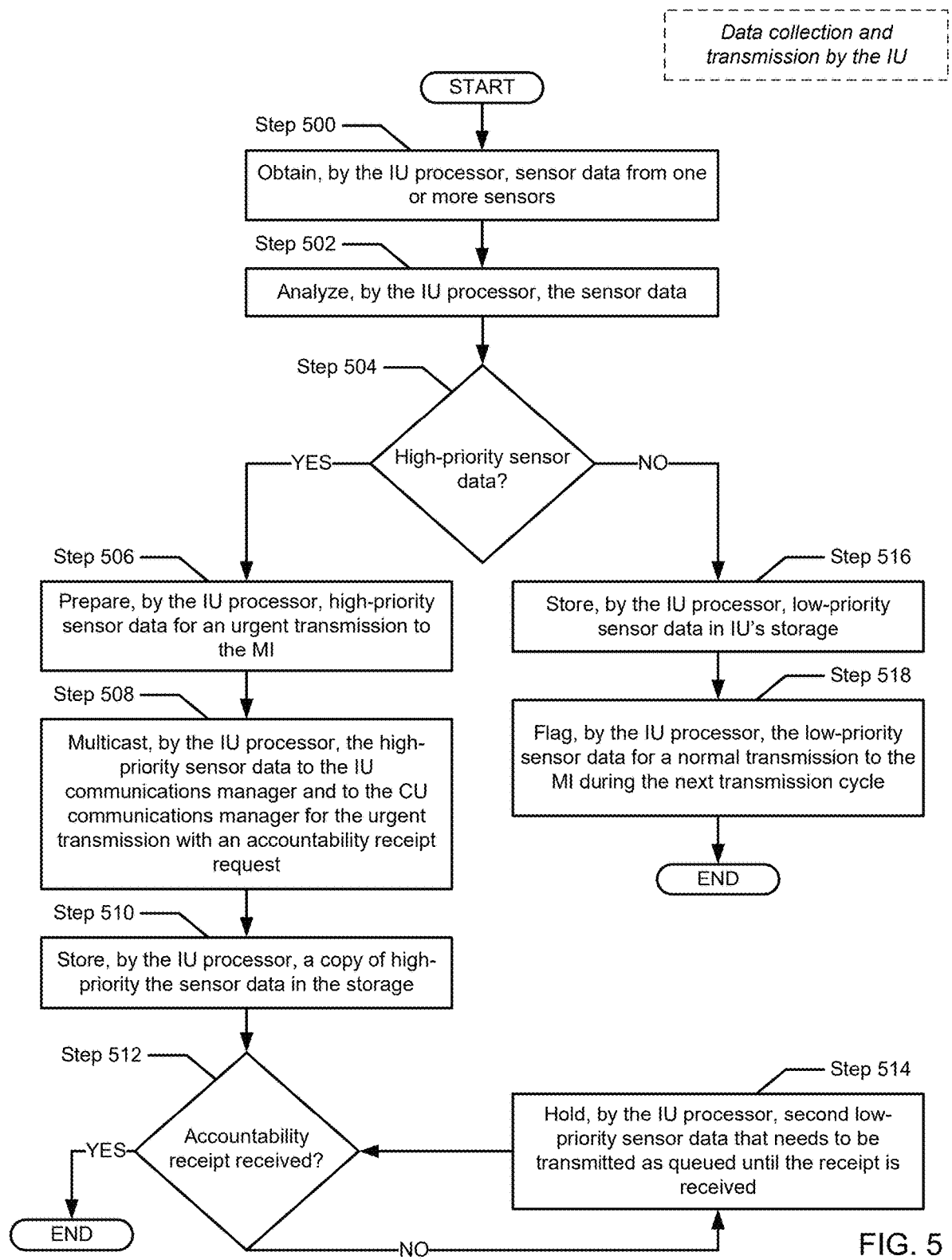
FIG. 5 shows data collection and transmission by the IU in accordance with one or more embodiments disclosed herein.

FIG. 5 shows data collection and transmission by the IU (e.g., 320, FIG. 3.4) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

In one or more embodiments, collection and transmission of data by the IU may include three separate processes: (i) collection and storage of data, (ii) data prioritization/traffic management, and (iii) transmission of data to outside elements (e.g., other tracking devices, the management infrastructure, etc.).

Turning now to FIG. 5, the method shown in FIG. 5 may be executed by, for example, the above-discussed IU. Other components of the system illustrated in FIG. 1 may also execute all or part of the method shown in FIG. 5 without departing from the scope of the embodiments disclosed herein.

In Step 500, the IU processor obtains sensor data (or other related data such as time data, location data, etc.) from one or more sensors (e.g., the IU sensors (e.g., 384, FIG. 3.4)) internal to the corresponding IC.

In one or more embodiments, the sensor data (with respect to, at least, environmental and situational measurements) may be obtained (e.g., may be dynamically fetched) as they become available (e.g., with no user manual intervention), or by the IU processor polling the IU sensors (by making schedule-driven/periodic "monitoring" calls (via appropriate protocols and/or interfaces) to them without affecting their ongoing production workloads) for new sensor data. Based on receiving the calls from the IU processor, the IU sensors may allow the IU processor to obtain the sensor data.

The sensor data may be obtained (or streamed) continuously as they generated, or they may be obtained in batches, for example, in scenarios where (i) the IU processor has received a sensor data analysis request, (ii) the IU sensors accumulate the information (the sensor data) and provide them to the IU processor at fixed time intervals, or (iii) the IU sensors store the information in their storages (or in an external entity), and notify the IU processor to access the information from their storages or from the external entity. In one or more embodiments, the information may be access-protected for the transmission from the IU sensors to the IU processor, e.g., using encryption.

In one or more embodiments, the IU processor's "sensor handling" process may compare current system time against a predetermined schedule to perform analyses. Different sensors may be polled at different frequencies depending on the nature of their information (e.g., location may be recorded on a less frequent basis than environmental sensing). Recorded sensor data may also include internal system telemetry with respect to, for example, memory, processor, and battery charge state.

In one or more embodiments, the IU processor's event detection process (performed in Step 502) may continuously scan recently occurred/stored sensor data in the storage/memory resource of the IU and compare those values to predetermined threshold values/levels.

In Step 502, the IU processor analyzes the sensor data to extract an analysis output. In one or more embodiments, the analysis output may specify, for example (but not limited to): a time stamp (e.g., to be able to evaluate a trend), an intrusion attempt into an IC (hosting the IU) by an unauthorized person, an unusual change in an amount of ammonia concentration of an internal environment of an IC, a log indicating that a predetermined internal temperature limit of an IC is exceeded, a log indicating that a predetermined geofencing limit is exceeded, a log indicating a presence of a live cargo in an IC, a log indicating a presence of a radiologic isotope, etc.

Based on the analysis output, the IU processor may infer, for example, the criticality/priority of the sensor data (see Step 504) so that the appropriate event communication and/or alerting (of the related entities) may be initiated.

As yet another example, based on the analysis output, the IU processor may perform a pattern detection, in which the IU processor may assess sensor data over a period of time to determine one or more trends in the data (e.g., the IC is chilling, atmospheric $CO_2$ in the IC is increasing, the battery state of the battery pack deployed to the IU is falling unusually fast, etc.). Each fault/event condition may be considered independently, and the resulting data trends may be matched against expected behaviors/patterns. If the trends do not align with expected patterns, an alert may be generated and transmitted, in which the priority of the alert may depend on the severity of the consequence of the critical fault (e.g., a complete system failure due to catastrophically failed battery pack prior to the next scheduled communication session).

In one or more embodiments, the IU processor may perform the analysis (and extract the output) by implementing a "sensor fusion" process (on the data) through integration of two or more sensor measurements and their trends over time, in which the analysis may refer to synthesizing information about the environment within and surrounding the IC. For example, a steady rise in atmospheric $CO_2$ values, along with audio patterns that are not correlated to background machinery, ship noise, or human speech characteristics, may indicate the presence of human trafficking victims.

In one or more embodiments, the extracted output may be used for further training and refinement of the ML models (employed by the IU processor) on real world shipment patterns over time.

In Step 504, based on the analysis output, the IU processor makes a first determination as to whether the sensor data is high-priority sensor data. Accordingly, in one or more embodiments, if the result of the first determination is YES (e.g., if a limit/threshold exceedance is detected), the method proceeds to Step 506. If the result of the first determination is NO, the method alternatively proceeds to Step 516.

For example, a "door open" event may be flagged as a high-priority event that causes high-priority sensor data. In most cases, a door open event is a unique event that represents a real-time change in the state of an IC cargo. During a door open event, the rate at which sensor data is captured is increased, and imagery is collected in both snapshot and video formats. These captured/collected data may then be stored locally (see Step 510) and cryptographically protected for law enforcement chain of custody purposes as well as immediately transmitted to the management infrastructure (as a data stream) via the IU communications manager (using the appropriate module(s)). The purpose of an immediate transmission is to ensure that the end-user is notified immediately of the event, but also to ensure that as much telemetry (and event recording data) are offloaded against the possibility that the tracking device will be tampered (or destroyed) during a potential IC compromise.

As yet another example, a limit exceedance may be flagged as a high-priority event that causes high-priority sensor data. An event may be triggered by a sensor measurement exceeding certain predetermined limits (e.g., a cargo shipment may have a high and low temperature or humidity requirement, a cargo shipment may have a geofencing requirement during certain periods of transit, etc.). In the event of limit exceedances, an outbound message may be generated by the IU to transmit to the management infrastructure (including the relevant data events, trends, and/or analysis output), and then passed to (via, for example, the CU) a DTN node along the corresponding DTN route for transmission. If an event is flagged as a low-priority event that causes low-priority sensor data, this data may be queued for transmission during the next scheduled transmission (see Step 518).

As yet another example, a FDIR identified event (e.g., an IU GPS module is rebooted for a known reason) may be flagged as a normal-priority event that causes normal-priority sensor data, in which the sensor data and analysis output (including the detected errors and trends) may be packed as an outbound message and queued/flagged for transmission during the next scheduled transmission.

In Step 506, as a result of the first determination in Step 504 being YES (the IU processor determines that a high-priority event has occurred), the IU processor prepares high-priority sensor data for an urgent transmission to the management infrastructure. In one or more embodiments, the IU processor may assemble/pack an outbound message to the management infrastructure including, at least, the relevant sensor data (e.g., the raw "source" data), time stamps, analysis output, and other system telemetry surrounding the high-priority event (so that an administrator of the management infrastructure may make a more informed determination (for example, the shipment might not be human trafficking victims—it may be livestock, as manifested in the analysis output)). The "high-priority" outbound message may be packed into a DTN bundle, for an easy transmission across the related DTN route, (as a bundle agent of the IU marks the bundle as a high-priority bundle via broadcast routing flag(s)) and passed to a next DTN node along the DTN route for transmission across the network.

In Step 508, the IU processor multicasts the high-priority outbound message to the IU communications manager and/or to the CU communications manager (via the proximity wireless communication path) for the urgent transmission (to the management infrastructure) with an accountability receipt request. For example, based on the first determination, the IU processor may send the high-priority outbound message/data to the IU proximity wireless communication module for an urgent transmission to the MI with an accountability receipt request.

As indicated, because the high-priority outbound message needs to be transmitted, the IU processor may immediately trigger all the communications handler/manager routines to establish a direct communication (through the IU's communications modules and/or the CU's communications modules) to connect to the management infrastructure. Thereafter, one or more active communications modules may immediately transmit the high-priority outbound message to the next DTN node (e.g., the next IU in the route, the management infrastructure, etc.).

In Step 510, the IU processor may store a copy of the high-priority outbound message in the storage/memory resource of the IU (for later use, for example, to train an ML model employed by the IU processor).

In Step 512, the IU processor makes a second determination as to whether the accountability receipt is received (from the next DTN node along the corresponding DTN route (e.g., from a second IU of a second IC/node in the DTN route)). Accordingly, in one or more embodiments, if the result of the second determination is YES, the method ends. If the result of the second determination is NO, the method alternatively proceeds to Step 514.

In Step 514, as a result of the second determination in Step 512 being NO (the IU processor determines that no accountability receipts is received), the IU processor holds, for example, low-priority data/message that needs to be transmitted to the management infrastructure (based on a predetermined schedule) as queued until the "accountability" receipt (e.g., "high-priority bundle/outbound message received" receipt) is received. The "hold" may only be removed (from the outbound message queue) once a positive determination of handoff has been made.

The IU processor may continue attempting to transmit the high-priority message until either: (i) the high-priority message is positively received by the next node (at which point, the IU processor will remove the message from the outbound message queue and record the successful transmission in its log), (ii) the IU processor detects a higher priority event (in which case that the higher priority event will take precedence in the outbound message queue), or (iii) the IU processor detects a fault condition (e.g., low battery power) that may cause a failure of IU if the IU continues to try to transmit (this could occur in a case where the rechargeable battery in the CU becomes depleted from executing the transmitters too long and the CU needs to power down the transmitters for a period of time to recharge the CU's battery).

In one or more embodiments, the DTN route (which operates based on a DTN bundle protocol) may include, at least, the IU as a source point, the second IU, and the management infrastructure as a destination point. Further, the DTN bundle protocol may (i) handle a disrupted time varying topology of the IU and the second IU in the DTN route, (ii) an intermittent connectivity issue between the IU and the second IU, and/or (iii) operates as an overlay protocol on the UDP using a convergence layer.

In one or more embodiments, following Step 514, the method may proceed to Step 512.

In Step 516, as a result of the first determination in Step 504 being NO (the IU processor determines that a low-priority event has occurred), the IU processor stores the related low-priority sensor data (along with the related analysis output and other related telemetry data) in the storage/memory resource of the IU. Before storing, the recorded, raw low-priority sensor data may be matched with a calibration value and time stamped. The resulting calibrated, time stamped sensor data may then be stored in the storage/memory resource of the IU.

In Step 518, the IU processor may flag (with the help of the bundle agent) the "stored" low-priority sensor data for a normal transmission to the management infrastructure during the next scheduled transmission cycle. In one or more embodiments, the method may end following Step 518.

As described above, life signal detection may be handled via the sensor fusion triggering processes. In general, the process analyzes the trends in sensor data, when combined or "fused", that are indicative of the presence of life signals. There may be several possible combinations of sensor signals, either by themselves or fused with others, indicative—but not conclusive—of the presence of life. In all cases, when a life sign is detected, a high-priority event may be generated and the corresponding high-priority data is offloaded to the management infrastructure for further analysis/evaluation by an administrator and/or for use in further training of ML models employed by the management infrastructure.

In one or more embodiments, potential combinations of sensor data/measurements indicative of life may include, for example (but not limited to): rising atmospheric $CO_2$ levels, falling $O_2$ levels in an internal environment of an IC; rising atmospheric ammonia in the internal environment of the IC; rising atmospheric methane (e.g., outgassing product of feces) in the internal environment of the IC; acoustic signatures that are not correlated to the internal/external environment (e.g., not ship or truck/road sounds, not wave motion, not construction sounds external to the container, not steel-on-steel impact, etc.) and show characteristics of human/animal sound patterns; changes in position of heat spots on thermal imaging inside the IC (where normal shipments are well secured and should not move in transit and if a heat spot has moved (and continues to move), it is likely alive); etc.

While some of these observables require direct observation of the human/animal presence (e.g., imagery), others (e.g., atmospheric gas concentration) may be detectable even if the human/animal is held in a porous box. These are often used to smuggle exotic animals and hide humans from obvious notice during loading/unloading—but breathing holes must be provided allowing the waste gasses to enter the main IC volume.

As discussed above, the CU is external to the IC (the CU is mounted to an external environment of the IC, where the IU is mounted to an internal environment of the IC) and cannot therefore be used to directly sense the presence or conditions inside the IC volume/environment. The CU may, however, through the use of an external microphone, make measurements of the ambient sound environment, which may be used to reduce and eliminate sounds detected inside the IC by the IU.

On the other hand, in order to determine if the tracking device units (the IU and the CU) have been tampered, anti-tamper functions and controls may be implemented to ensure the confidentiality, integrity, and availability "triad" of information and system assurance. These may include electronic, computational, cryptographic, operational, and/or physical controls.

Confidentiality of information (e.g., operational data, configuration data, measurement/sensor data, etc.) may be ensured using cryptographic techniques. These techniques may be implemented by the IU processor (and potentially a secondary hardware crypto processor, if required) to protect sensitive configuration data (e.g., network addresses, network session security keys, etc.), operational data (e.g., communication schedules, customer sensitive information associated with the shipment, etc.), and measurements. Confidentiality (where required) may be provided by AES-256 cryptography.

Further, measurements may be cryptographically protected for law enforcement and legal purposes. It may be necessary to maintain three independent, verifiable copies of each measurement data that may be important in a legal proceeding (e.g., one for the defense, one for the prosecution, and one for independent verification by the presiding judge). The objective here is not to provide confidentiality but rather integrity.

Cryptographic techniques (using SHA-256 hashing and AES-256 cryptography) may be implemented to both protect and provide independent verification of the identical data content of the three separate copies of sensor data (set). SHA-256 provides a mathematical one-way function that may cryptographically provide a "unique signature" (e.g., a hash) of a complex data set that cannot be reversed. In this manner, a hash code provides a unique fingerprint of the data set that reveals nothing about the content of the data itself. However, each time the original data set is executed through the hash algorithm/model, the same hash code is generated. In this manner, it is possible to detect if the data set has been tampered without decrypting the data-providing secure integrity verification.

In one or more embodiments, availability of information is ensured by maintaining local copies of data sets until a confirmed positive accounting of the messages' receipt from, for example, the management infrastructure is obtained. This feature may be provided by the DTN module (in conjunction with the IU processor). Once data is successfully transmitted to the management infrastructure, availability may be ensured through information assurance practices (that are used to architect the communication network).

Further, system availability may include both the availability of a given IU/CU to operate as well as the availability of the communication channels between the IU/CU and the communication network. Availability of the IU/CU is provided through a robust and redundant design, in which power systems are oversized, redundant communication paths, sensors, and processors are provided, and a rigorous autonomous FDIR scheme is used.

At a higher (network) level, functions and responsibility are distributed and redundant, indicating there is no "single point node" in the architecture (e.g., any DTN node may serve the function of another DTN node without exposing any hierarchy; a true global mesh in the sense that there is no routing up to a gateway to aggregate, every node in a DTN route is an equivalent peer). As described above, communication links/paths are based on mesh topologies and DTN techniques. Redundant and complimentary communication channels are provided (e.g., through local low-power/frequency RF communication between local ICs, Wi-Fi and/or cellular communication to proximity infrastructure, global SATCOM for wide-area and non-infrastructure supported communication, etc.). While the CU provides most of the immediate communications capability (as it is outside the IC's "Faraday cage"), the IU has its own integral communications suite and is capable of communicating during periods where either the IC's door is open (for loading/unloading) or through steel conduction pathways between stacked ICs. In this manner, the failure of the CU (or removal of the CU from an IC) does not preclude the IU from communicating in real-time to nearest neighbors in the IC stack (which will then relay its messages using DTN techniques) or simply queuing all message traffic for eventual transmission as soon as the IC's door is open.

In one or more embodiments, anti-tamper functions may include physical, electromagnetic, and operational protections. Physical protections may include rugged design and secure placement of the IU within the protected "rib" volume of shipping ICs. This places the hardware out of easy access by a malicious actor (who must first gain entry to the container before attempting to remove or damage the IU). Within the IU itself, several anti-tamper elements are provided, including container penetration (by sensing change in atmospheric pressure resulting from a breach of the sealed housing) and electromagnetic signature detection by which a magnetometer is used to detect change in state of the local electromagnetic field which would be produced by moving the IU once it has been installed or by opening the IU's enclosure. Each of these events will trigger a high-priority event and send out an immediate alert via the IU's communication channels.

Operationally, the IU is never "off". It is powered during installation and operates continuously for its, at least, 2-year service life (with 3-year design life). Any software changes (e.g., over the air) or reboot events are logged and the log is cryptographically protected. If a reboot event is detected without a corresponding explanation (e.g., shutdown/reboot following software update), this may trigger a high-priority alert event, which may be hard-coded at the driver/OS level and cannot be interrupted. Attacks intended to "spoof" the log by altering the onboard clock are protected against by the IU and CU's ability to receive GPS and external network time, making a detection of a dime lag between the tracking device's clock and current time easy. Discrepancies may trigger an immediate alert ant hat may be cleared by the management infrastructure if there is a good explanation for the time lag (e.g., a known fault condition).

As discussed above, the tracking device may "reports in" to the management infrastructure on a predetermined schedule. This means that throughout its life, the tracking device may routinely contact the management infrastructure to transfer system status, housekeeping, and telemetry, and to obtain any necessary updates. If the tracking device fails to check-in, the management infrastructure may note this and flag the tracking device as possibly faulty or tampered. If the tracking device continues to fail to report, that IC may be flagged as suspicious. A predetermined contact schedule allows each tracking device to use its own, independent contact schedule, that while deterministic (if you know the pseudorandom sequence generator key), appears random and is very difficult to predict observationally. In this manner, the system denies an adversary the ability to exploit periods of known "silence" between contacts.

As discussed above, one or more embodiments uses RF signals to communicate bi-directionally through structural gaps in an IC and a container floor (of the IC) in order to pass information between an IU (of the IC) and a CU (of the IC). As the RF is not limited to the structure of the IC, one or more embodiments also provides communication between tracking devices on different ICs located in proximity such as in the same "stack" of ICs or within several hundred meters of each other in an IC yard, port, or hold of a ship.

Figure 6:
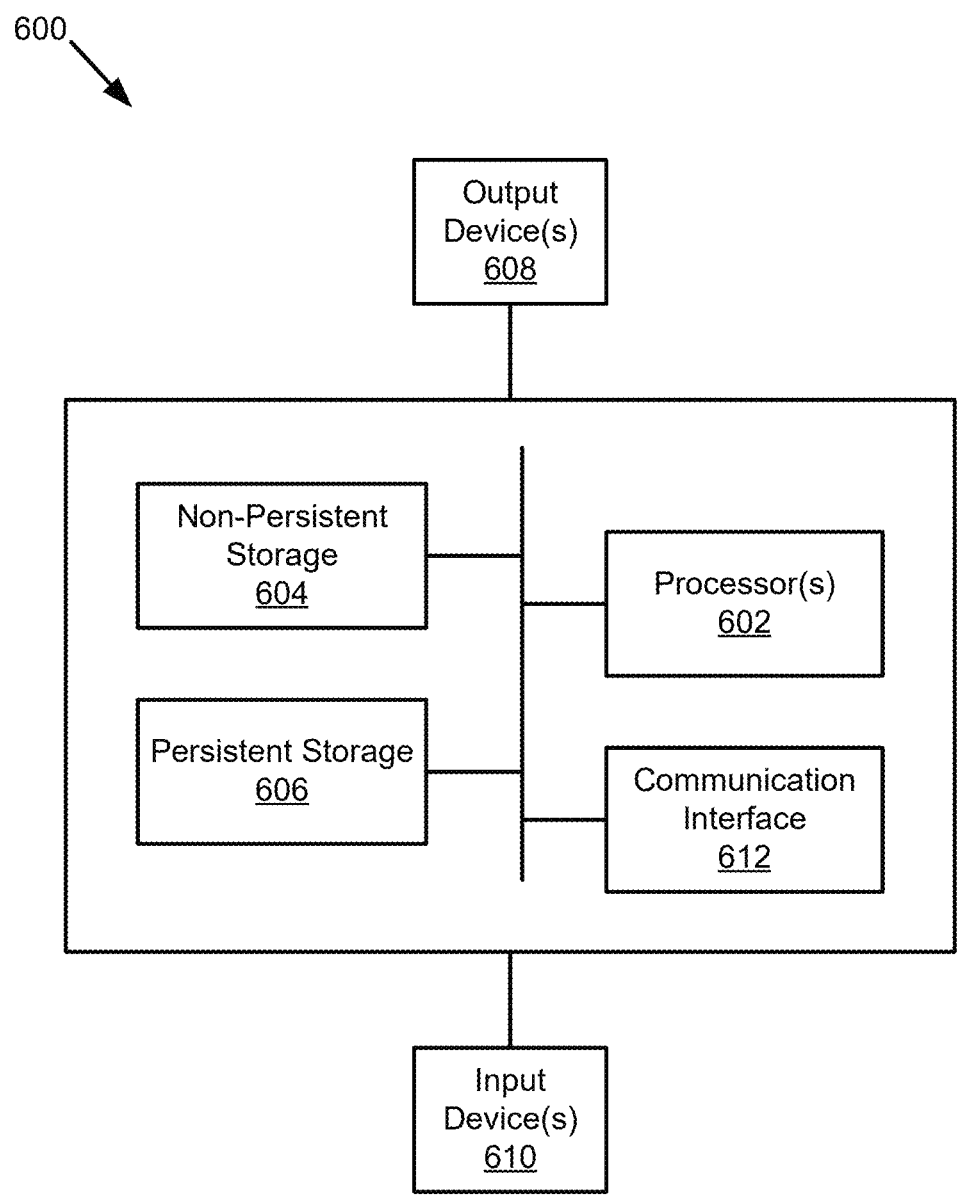
FIG. 6 shows a diagram of a computing device in accordance with one or more embodiments disclosed herein.

Turning now to FIG. 6, FIG. 6 shows a diagram of a computing device in accordance with one or more embodiments disclosed herein.

In one or more embodiments disclosed herein, the computing device (600) may include one or more computer processors (602), non-persistent storage (604) (e.g., volatile memory, such as RAM, cache memory), persistent storage (606) (e.g., a non-transitory computer readable medium, a hard disk, an optical drive such as a CD drive or a DVD drive, a Flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (e.g., a LAN, a WAN, Internet, mobile network, etc.) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Specific embodiments disclosed herein are described in detail with reference to the accompanying figures. In the above detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the above description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A system, the system comprising:
a management infrastructure (MI); and
a set of intermodal containers (ICs),
   wherein an IC of the set of ICs comprises a tracking device that is formed based on a communications unit (CU) and an instrumentation unit (IU),
   wherein the IU comprises an instrumentation package that comprises an IU processor and a first proximity wireless communication module (PWCM),
   wherein the CU comprises a CU processor, a second PWCM, and a communication module (CM),
   wherein the IU processor sends data to the PWCM by instructing the PWCM to send the data to the CU processor,
   wherein, upon receiving the data, the PWCM:
      converts the data into a low-frequency radio frequency (RF) signal,
      sends the low-frequency RF signal to the PWCM using a proximity wireless communication path that is established through a wall of the IC,
   wherein, upon receiving the low-frequency RF signal, the second PWCM:
      converts the low-frequency RF signal to second data,
      sends the second data to the CU processor,
   wherein, upon receiving the second data, the CU processor:
      frames the second data based on a protocol of an established communication link between the CM and the MI to generate framed second data,
      sends the framed second data to the CM, and
   wherein, upon receiving the framed second data, the CM transmits the framed second data to the MI using the link that is established over a network.

2. The system of claim 1,
wherein the CU is mounted to an external environment of the IC, and
wherein the IU is mounted to an internal environment of the IC.

3. The system of claim 1,
wherein the wall is a metallic wall, and
wherein the metallic wall is steel.

4. The system of claim 1,
wherein the IU processor receives the data from a set of sensors of the IU, and
wherein the data is high-priority sensor data that needs to be transmitted to the MI.

5. The system of claim 4, wherein the set of sensors comprises a global positioning system sensor, a special purpose sensor, an image capture sensor, and an environmental sensor.

6. The system of claim 5, wherein the special purpose sensor is at least one selected from a group consisting of a chemical detection sensor, a biological sensor, and a radiation sensor.

7. The system of claim 5, wherein the environmental sensor is at least one selected from a group consisting of a temperature sensor, a humidity sensor, a count sensor, a differential pressure sensor, a corrosion sensor, and an audio sensor.

8. The system of claim 1,
wherein the proximity wireless communication path is a low-frequency RF communication channel, and
wherein the low-frequency RF communication channel implements long range signal modulation, link coding, and RF channelization protocols.

9. The system of claim 1, wherein the proximity wireless communication path enables the PWCM to send the low-frequency RF signal to the second PWCM without requiring a physical modification to the IC or a cabling between the IU and the CU.

10. A method for managing data, the method comprising:
initiating, by a communications unit (CU) processor of a CU, a communication module (CM);
establishing, by the CM, a communication link (CL) to a management infrastructure (MI) over a network;
notifying, by the CM, the CU processor about the CL by sending a notification;
after the notifying:
framing, by the CU processor, data that is received from a proximity wireless communication module (PWCM) based on a protocol of the CL to generate framed data,
wherein the PWCM has received the data from a second PWCM of an instrumentation unit (IU) over a proximity wireless communication path,
wherein the CU and the IU form a tracking device that is mounted to an intermodal container (IC);
transmitting, by the CU processor, the framed data to the MI over the CL;
making, by the CU processor, a determination that the CL needs to be terminated;
directing, by the CU processor, a communications manager of the CU to terminate the CL and to manage power consumption in the CU; and
powering down, by the communications manager, the CM to terminate the CL and to manage the power consumption in the CU.

11. The method of claim 10,
wherein the second PWCM receives the data from an IU processor of the IU,
wherein the IU processor receives the data from a set of sensors of the IU,
wherein, upon receiving the data from the set of sensors, the IU processor analyzes the data to extract an analysis output,
wherein, based on the analysis output, the IU processor makes a first determination that the data is high-priority sensor data, and
wherein, based on the first determination, the IU processor sends the data to the second PWCM for an urgent transmission to the MI with an accountability receipt request.

12. The method of claim 11, wherein the analysis output specifies a time stamp, an intrusion attempt into the container by an unauthorized person, an unusual change in an amount of ammonia concentration of the internal environment of the container, a log indicating that a predetermined internal temperature limit of the container is exceeded, a second log indicating that a predetermined geofencing limit is exceeded, a third log indicating a presence of a live cargo in the container, and a fourth log indicating a presence of radiologic isotope.

13. The method of claim 11,
wherein the set of sensors comprises a global positioning system sensor, a special purpose sensor, an image capture sensor, and an environmental sensor,
wherein the special purpose sensor is at least one selected from a group consisting of a chemical detection sensor, a biological sensor, and a radiation sensor, and
wherein the environmental sensor is at least one selected from a group consisting of a temperature sensor, a humidity sensor, a count sensor, a differential pressure sensor, a corrosion sensor, and an audio sensor.

14. The method of claim 11,
wherein, after sending the data to the second PWCM, the IU processor makes a second determination that an accountability receipt associated with the request is not received from a second IU of a second IC in a disruption tolerant network (DTN) route,
wherein, based on the second determination, the IU processor holds low-priority data that needs to be transmitted to the MI as queued until the accountability receipt is received from the second IU,
wherein the DTN route comprises at least the IU as a source point, the second IU, and the MI as a destination point, and
wherein the DTN route operates based on a DTN bundle protocol.

15. The method of claim 13,
wherein, before sending the data to the second PWCM, the IU processor prepares the data by:
packing the data into a DTN bundle for an easy transmission across the DTN route, and marking the DTN bundle as a high-priority bundle.

16. The method of claim 13,
wherein the DTN bundle protocol handles a disrupted time varying topology of the IU and the second IU in the DTN route,
wherein the DTN bundle protocol further handles an intermittent connectivity issue between the IU and the second IU, and
wherein the DTN bundle protocol operates as an overlay protocol on a user datagram protocol (UDP) using a convergence layer.

17. The method of claim 10,
wherein the CU is mounted to an external environment of the IC, and
wherein the IU is mounted to an internal environment of the IC.

18. The method of claim 10,
wherein the proximity wireless communication path is a low-frequency RF communication channel, and
wherein the low-frequency RF communication channel implements long range signal modulation, link coding, and RF channelization protocols.

19. The method of claim 10, wherein the proximity wireless communication path enables the second PWCM to send a low-frequency RF signal to the PWCM without requiring a physical modification to the IC or a cabling between the IU and the CU.

20. A method for managing data, the method comprising:
receiving, by a communications unit (CU) processor of a first CU of a first container, data from a second CU of a second container via a proximity radio frequency module of the first CU,
wherein the first container and the second container are located in a container stack,
wherein the first CU is mounted to an external environment of the first container,
wherein the second CU is mounted to an external environment of the second container;

directing, by the CU processor, a communications manager of the first CU to initiate a communication module (CM) of the first CU;

after being initiated and by the CM, establishing a communication link (CL) to a management infrastructure (MI) over a network;

notifying, by the CM, the CU processor about the CL with a notification;

after the notifying:
- framing, by the CU processor, the data to generate a framed data per the CL's protocol, wherein the framed data is provided to the CM for transmission;
- transmitting, by the CM, the framed data to the MI over the CL;
- making, by the CU processor, a determination that the CL needs to be terminated;
- directing, by the CU processor, the communications manager to terminate the CL and to manage power consumption in the first CU; and
- powering down, by the communications manager, the CM to terminate the CL and to manage the power consumption in the CU.

* * * * *